(12) United States Patent
Rosson

(10) Patent No.: US 11,536,913 B2
(45) Date of Patent: Dec. 27, 2022

(54) FIBER OPTIC CONNECTORS AND CONNECTORIZATION EMPLOYING ADHESIVE ADMITTING ADAPTERS

(71) Applicant: Corning Research & Development Corporation, Corning, NY (US)

(72) Inventor: Joel Christopher Rosson, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/530,749

(22) Filed: Nov. 19, 2021

(65) Prior Publication Data

US 2022/0075127 A1    Mar. 10, 2022

Related U.S. Application Data

(63) Continuation of application No. 16/814,461, filed on Mar. 10, 2020, now Pat. No. 11,215,768, which is a continuation of application No. 16/015,588, filed on Jun. 22, 2018, now Pat. No. 10,605,998, which is a continuation-in-part of application No. PCT/US2017/064063, filed on Nov. 30, 2017.

(Continued)

(51) Int. Cl.
*G02B 6/38* (2006.01)
*G02B 6/00* (2006.01)
(Continued)

(52) U.S. Cl.
CPC .......... *G02B 6/3879* (2013.01); *G02B 6/387* (2013.01); *G02B 6/3825* (2013.01); *G02B 6/3826* (2013.01); *G02B 6/3831* (2013.01); *G02B 6/3851* (2013.01); *G02B 6/3869* (2013.01); *G02B 6/3873* (2013.01); *G02B 6/3885* (2013.01); *G02B 6/381* (2013.01);
(Continued)

(58) Field of Classification Search
CPC ...... G02B 6/00; G02B 6/3825; G02B 6/3831; G02B 6/3869; G02B 6/3873; G02B 6/3887
USPC .......................................................... 385/78
See application file for complete search history.

(56) References Cited

U.S. PATENT DOCUMENTS 3,074,107 A    1/1963  Kiyoshi et al.
3,532,783 A   10/1970  Pusey et al.
(Continued)

FOREIGN PATENT DOCUMENTS

AU    2006232206 A1   10/2006
CN       1060911 A    5/1992
(Continued)

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.

(Continued)

*Primary Examiner* — Kaveh C Kianni
(74) *Attorney, Agent, or Firm* — Michael E. Carroll, Jr.

(57) ABSTRACT

Fiber optic connectors, connector housings, connectorized cable assemblies, and methods for the connectorization of cable assemblies are provided with particular cable adapter features, adapter extensions, multi-diametrical sealing flexures, subcutaneous sealing elements, and combinations thereof, for improved connector and cable performance, integrity, and durability.

8 Claims, 12 Drawing Sheets

Related U.S. Application Data

(60) Provisional application No. 62/526,018, filed on Jun. 28, 2017, provisional application No. 62/526,011, filed on Jun. 28, 2017, provisional application No. 62/526,195, filed on Jun. 28, 2017.

(51) Int. Cl.
*G02B 6/44* (2006.01)
*G02B 6/42* (2006.01)

(52) U.S. Cl.
CPC ............ *G02B 6/389* (2013.01); *G02B 6/3821* (2013.01); *G02B 6/3837* (2013.01); *G02B 6/3841* (2013.01); *G02B 6/3843* (2013.01); *G02B 6/3849* (2013.01); *G02B 6/3871* (2013.01); *G02B 6/3887* (2013.01); *G02B 6/3889* (2013.01); *G02B 6/3893* (2013.01); *G02B 6/3895* (2013.01); *G02B 6/3897* (2013.01); *G02B 6/4262* (2013.01); *G02B 6/4401* (2013.01); *G02B 6/4446* (2013.01); *G02B 6/4471* (2013.01); *G02B 6/4472* (2013.01); *G02B 6/4477* (2013.01); *G02B 6/4479* (2013.01)

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A * | 11/1988 | Kosman ............ G02B 6/4246 385/91 |
| 4,842,363 A | 6/1989 | Margolin et al. |
| 4,844,570 A | 7/1989 | Tanabe |
| 4,854,664 A | 8/1989 | McCartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A * | 10/1991 | Bulman ............... G02B 6/3887 385/80 |
| 5,067,783 A * | 11/1991 | Lampert .............. G02B 6/3877 385/60 |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,317,663 A | 5/1994 | Beard et al. |
| 5,321,917 A | 6/1994 | Franklin et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A * | 5/1996 | Murakami .......... G02B 6/3825 385/84 |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,789,701 A | 8/1998 | Wettengel et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |

(56) References Cited

U.S. PATENT DOCUMENTS

| | | | |
|---|---|---|---|
| 5,884,003 A | 3/1999 | Cloud et al. | |
| 5,887,099 A | 3/1999 | Csipkes et al. | |
| 5,913,001 A * | 6/1999 | Nakajima | G02B 6/3889 |
| | | | 385/80 |
| 5,920,669 A | 7/1999 | Knecht et al. | |
| 5,923,804 A | 7/1999 | Rosson | |
| 5,925,191 A | 7/1999 | Stein et al. | |
| 5,926,596 A | 7/1999 | Edwards et al. | |
| 5,960,141 A | 9/1999 | Sasaki et al. | |
| 5,961,344 A | 10/1999 | Rosales et al. | |
| 5,971,626 A | 10/1999 | Knodell et al. | |
| 5,993,070 A | 11/1999 | Tamekuni et al. | |
| RE36,592 E | 2/2000 | Giebel et al. | |
| 6,030,129 A | 2/2000 | Rosson | |
| 6,035,084 A | 3/2000 | Haake et al. | |
| 6,045,270 A * | 4/2000 | Weiss | G02B 6/3839 |
| | | | 385/59 |
| 6,079,881 A | 6/2000 | Roth | |
| 6,094,517 A | 7/2000 | Yuuki | |
| 6,108,482 A | 8/2000 | Roth | |
| 6,112,006 A | 8/2000 | Foss | |
| 6,149,313 A | 11/2000 | Giebel et al. | |
| 6,151,432 A | 11/2000 | Nakajima et al. | |
| RE37,028 E | 1/2001 | Cooke et al. | |
| 6,173,097 B1 | 1/2001 | Throckmorton et al. | |
| 6,179,482 B1 | 1/2001 | Takizawa et al. | |
| 6,188,822 B1 | 2/2001 | McAlpine et al. | |
| 6,193,421 B1 | 2/2001 | Tamekuni et al. | |
| RE37,079 E | 3/2001 | Stephenson et al. | |
| RE37,080 E | 3/2001 | Stephenson et al. | |
| 6,200,040 B1 | 3/2001 | Edwards et al. | |
| 6,206,579 B1 | 3/2001 | Selfridge et al. | |
| 6,206,581 B1 * | 3/2001 | Driscoll | G02B 6/3869 |
| | | | 385/139 |
| 6,220,762 B1 | 4/2001 | Kanai et al. | |
| 6,224,268 B1 | 5/2001 | Manning et al. | |
| 6,224,270 B1 | 5/2001 | Nakajima et al. | |
| 6,229,944 B1 | 5/2001 | Yokokawa et al. | |
| 6,234,683 B1 | 5/2001 | Waldron et al. | |
| 6,234,685 B1 | 5/2001 | Carlisle et al. | |
| 6,249,628 B1 | 6/2001 | Rutterman et al. | |
| 6,256,438 B1 | 7/2001 | Gimblet | |
| 6,261,006 B1 | 7/2001 | Selfridge | |
| 6,264,374 B1 | 7/2001 | Selfridge et al. | |
| 6,287,016 B1 | 9/2001 | Weigel | |
| 6,293,710 B1 | 9/2001 | Lampert et al. | |
| 6,298,190 B2 | 10/2001 | Waldron et al. | |
| 6,305,849 B1 | 10/2001 | Roehrs et al. | |
| 6,321,013 B1 | 11/2001 | Hardwick et al. | |
| 6,356,390 B1 | 3/2002 | Hall, Jr. | |
| 6,356,690 B1 | 3/2002 | McAlpine et al. | |
| 6,357,929 B1 | 3/2002 | Roehrs et al. | |
| 6,371,660 B1 | 4/2002 | Roehrs et al. | |
| 6,375,363 B1 * | 4/2002 | Harrison | G02B 6/3849 |
| | | | 385/77 |
| 6,379,054 B2 | 4/2002 | Throckmorton et al. | |
| 6,386,891 B1 | 5/2002 | Howard et al. | |
| 6,402,388 B1 | 6/2002 | Imazu et al. | |
| 6,404,962 B1 | 6/2002 | Hardwick et al. | |
| 6,409,391 B1 * | 6/2002 | Chang | G02B 6/4292 |
| | | | 385/115 |
| 6,422,764 B1 | 7/2002 | Marrs et al. | |
| 6,427,035 B1 | 7/2002 | Mahony | |
| 6,428,215 B1 | 8/2002 | Nault | |
| 6,439,780 B1 | 8/2002 | Mudd et al. | |
| 6,466,725 B2 | 10/2002 | Battey et al. | |
| 6,496,641 B1 | 12/2002 | Mahony | |
| 6,501,888 B2 | 12/2002 | Gimblet et al. | |
| 6,522,804 B1 | 2/2003 | Mahony | |
| 6,529,663 B1 | 3/2003 | Parris et al. | |
| 6,533,468 B2 | 3/2003 | Nakajima et al. | |
| 6,536,956 B2 | 3/2003 | Luther et al. | |
| 6,539,147 B1 | 3/2003 | Mahony | |
| 6,540,410 B2 | 4/2003 | Childers et al. | |
| 6,542,652 B1 | 4/2003 | Mahony | |
| 6,542,674 B1 | 4/2003 | Gimblet | |
| 6,546,175 B1 | 4/2003 | Wagman et al. | |
| 6,554,489 B2 | 4/2003 | Kent et al. | |
| 6,579,014 B2 | 6/2003 | Melton et al. | |
| 6,599,026 B1 | 7/2003 | Fahrnbauer et al. | |
| 6,599,027 B2 | 7/2003 | Miyake et al. | |
| 6,614,980 B1 | 9/2003 | Mahony | |
| 6,618,526 B2 | 9/2003 | Jackman et al. | |
| 6,619,697 B2 | 9/2003 | Griffioen et al. | |
| 6,621,964 B2 | 9/2003 | Quinn et al. | |
| 6,625,375 B1 | 9/2003 | Mahony | |
| 6,629,782 B2 | 10/2003 | McPhee et al. | |
| 6,644,862 B1 | 11/2003 | Berto et al. | |
| 6,648,520 B2 | 11/2003 | McDonald et al. | |
| 6,668,127 B1 | 12/2003 | Mahony | |
| 6,672,774 B2 | 1/2004 | Theuerkorn et al. | |
| 6,678,442 B2 | 1/2004 | Gall et al. | |
| 6,678,448 B2 | 1/2004 | Moisel et al. | |
| 6,685,361 B1 | 2/2004 | Rubino et al. | |
| 6,695,489 B2 | 2/2004 | Nault | |
| 6,702,475 B1 | 3/2004 | Giobbio et al. | |
| 6,714,708 B2 | 3/2004 | McAlpine et al. | |
| 6,714,710 B2 | 3/2004 | Gimblet | |
| 6,729,773 B1 | 5/2004 | Finona et al. | |
| 6,738,555 B1 | 5/2004 | Cooke et al. | |
| 6,748,146 B2 | 6/2004 | Parris | |
| 6,748,147 B2 | 6/2004 | Quinn et al. | |
| 6,771,861 B2 | 8/2004 | Wagner et al. | |
| 6,785,450 B2 | 8/2004 | Wagman et al. | |
| 6,789,950 B1 | 9/2004 | Loder et al. | |
| 6,809,265 B1 | 10/2004 | Gladd et al. | |
| 6,841,729 B2 | 1/2005 | Sakabe et al. | |
| 6,848,838 B2 * | 2/2005 | Doss | G02B 6/25 |
| | | | 385/81 |
| 6,856,748 B1 * | 2/2005 | Elkins, II | G02B 6/3825 |
| | | | 385/100 |
| 6,877,906 B2 | 4/2005 | Mizukami et al. | |
| 6,880,219 B2 | 4/2005 | Griffioen et al. | |
| 6,899,467 B2 | 5/2005 | McDonald et al. | |
| 6,908,233 B2 | 6/2005 | Nakajima et al. | |
| 6,909,821 B2 | 6/2005 | Ravasio et al. | |
| 6,916,120 B2 | 7/2005 | Zimmel et al. | |
| 6,944,387 B2 | 9/2005 | Howell et al. | |
| 6,962,445 B2 | 11/2005 | Zimmel et al. | |
| 6,970,629 B2 | 11/2005 | Lail et al. | |
| 6,983,095 B2 | 1/2006 | Reagan et al. | |
| 7,011,454 B2 | 3/2006 | Caveney et al. | |
| 7,013,074 B2 | 3/2006 | Battey et al. | |
| 7,025,507 B2 | 4/2006 | de Marchi | |
| 7,033,191 B1 | 4/2006 | Cao | |
| 7,044,650 B1 | 5/2006 | Tran et al. | |
| 7,052,185 B2 | 5/2006 | Rubino et al. | |
| 7,079,734 B2 | 7/2006 | Seddon et al. | |
| 7,088,899 B2 | 8/2006 | Reagan et al. | |
| 7,090,406 B2 | 8/2006 | Melton et al. | |
| 7,090,407 B2 | 8/2006 | Melton et al. | |
| 7,090,409 B2 | 8/2006 | Nakajima et al. | |
| 7,103,255 B2 | 9/2006 | Reagan et al. | |
| 7,103,257 B2 | 9/2006 | Donaldson et al. | |
| 7,104,702 B2 | 9/2006 | Barnes et al. | |
| 7,111,990 B2 | 9/2006 | Melton et al. | |
| 7,113,679 B2 | 9/2006 | Melton et al. | |
| 7,118,283 B2 | 10/2006 | Nakajima et al. | |
| 7,118,284 B2 | 10/2006 | Nakajima et al. | |
| 7,120,347 B2 | 10/2006 | Blackwell et al. | |
| 7,137,742 B2 | 11/2006 | Theuerkorn et al. | |
| 7,146,089 B2 | 12/2006 | Reagan et al. | |
| 7,146,090 B2 | 12/2006 | Vo et al. | |
| 7,150,567 B1 | 12/2006 | Luther et al. | |
| 7,165,893 B2 | 1/2007 | Schmitz | |
| 7,171,102 B2 | 1/2007 | Reagan et al. | |
| 7,178,990 B2 | 2/2007 | Caveney et al. | |
| 7,184,634 B2 | 2/2007 | Hurley et al. | |
| 7,195,403 B2 | 3/2007 | Oki et al. | |
| 7,200,317 B2 | 4/2007 | Reagan et al. | |
| 7,201,518 B2 | 4/2007 | Holmquist | |
| 7,204,644 B2 | 4/2007 | Barnes et al. | |
| 7,213,975 B2 | 5/2007 | Khemakhem et al. | |

(56) References Cited

U.S. PATENT DOCUMENTS

| | | | |
|---|---|---|---|
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,241,056 B1 | 7/2007 | Kuffel et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,270,487 B2 | 9/2007 | Billman et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,467,896 B2 | 12/2008 | Melton et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,497,896 B2 | 3/2009 | Bromet et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,621,675 B1 * | 11/2009 | Bradley | G02B 6/3888 |
| | | | 385/86 |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,015 B2 | 8/2010 | Melton et al. |
| 7,785,019 B2 | 8/2010 | Lewallen et al. |
| 7,802,926 B2 | 9/2010 | Leeman et al. |
| 7,805,044 B2 | 9/2010 | Reagan et al. |
| 7,806,599 B2 | 10/2010 | Margolin et al. |
| 7,820,090 B2 | 10/2010 | Morrow et al. |
| 7,844,148 B2 | 11/2010 | Jenkins et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,942,590 B2 | 5/2011 | Lu et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 * | 7/2012 | Gronvall | G02B 6/4441 |
| | | | 385/139 |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |

(56) References Cited

U.S. PATENT DOCUMENTS

| | | |
|---|---|---|
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 * | 7/2014 | Barnette ............ G02B 6/3869 385/80 |
| 8,770,861 B2 | 7/2014 | Smith et al. |
| 8,770,862 B2 | 7/2014 | Lu et al. |
| 8,821,036 B2 | 9/2014 | Shigehara |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,146,364 B2 | 9/2015 | Chen et al. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Power et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,444 B2 | 12/2016 | Barnette et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,557,504 B2 | 1/2017 | Holmberg et al. |
| 9,581,775 B2 | 2/2017 | Kondo et al. |
| 9,588,304 B2 | 3/2017 | Durrant et al. |
| 9,612,407 B2 | 4/2017 | Kobayashi et al. |
| 9,618,704 B2 | 4/2017 | Dean et al. |
| 9,618,718 B2 * | 4/2017 | Islam ............... G02B 6/4416 |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 * | 5/2017 | Kim .............. G02B 6/4243 |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 * | 9/2017 | Kim ..................... G02B 6/34 |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Claessens et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| D810,029 S | 2/2018 | Robert et al. |
| 9,885,841 B2 | 2/2018 | Pepe et al. |
| 9,891,391 B2 * | 2/2018 | Watanabe ............ G02B 6/3893 |
| 9,905,933 B2 | 2/2018 | Scheucher |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Ne et al. |
| 10,288,820 B2 | 5/2019 | Coenegracht |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |

(56) References Cited

U.S. PATENT DOCUMENTS

| | | |
|---|---|---|
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 * | 12/2019 | Nhep .................. G02B 6/3888 |
| 10,502,916 B2 | 12/2019 | Coan et al. |
| 10,520,683 B2 | 12/2019 | Nhep |
| 10,539,745 B2 | 1/2020 | Kamada et al. |
| 10,545,298 B2 * | 1/2020 | Bauco .................. G02B 6/3878 |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| 10,613,278 B2 | 4/2020 | Kempeneers et al. |
| 10,620,388 B2 | 4/2020 | Isenhour et al. |
| 10,656,347 B2 * | 5/2020 | Kato .................. G02B 6/3887 |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 2001/0002220 A1 | 5/2001 | Throckmorton et al. |
| 2001/0012428 A1 | 8/2001 | Nakajima et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 * | 1/2002 | Farrar .................. G02B 6/3893 385/53 |
| 2002/0062978 A1 | 5/2002 | Sakabe et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0122653 A1 | 9/2002 | Donaldson et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0063867 A1 | 4/2003 | McDonald et al. |
| 2003/0063868 A1 * | 4/2003 | Fentress ............... G02B 6/4465 385/60 |
| 2003/0063897 A1 | 4/2003 | Heo |
| 2003/0080555 A1 | 5/2003 | Griffioen et al. |
| 2003/0086664 A1 | 5/2003 | Moisel et al. |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0047566 A1 | 3/2004 | McDonald et al. |
| 2004/0052474 A1 | 3/2004 | Lampert et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0206542 A1 | 10/2004 | Gladd et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0054237 A1 | 3/2005 | Gladd et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 * | 7/2006 | Suzuki .................. G02B 6/3807 385/53 |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |

(56) References Cited

U.S. PATENT DOCUMENTS

| | | |
|---|---|---|
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1* | 7/2008 | Lu ............... G02B 6/3821 385/62 |
| 2008/0175542 A1* | 7/2008 | Lu ............... G02B 6/3869 385/62 |
| 2008/0175544 A1 | 7/2008 | Fujiwara et al. |
| 2008/0175546 A1* | 7/2008 | Lu ............... G02B 6/3851 385/92 |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0240658 A1 | 10/2008 | Leeman et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2008/0310796 A1* | 12/2008 | Lu ............... G02B 6/3825 385/72 |
| 2008/0317415 A1* | 12/2008 | Hendrickson ........ G02B 6/4465 385/77 |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0136184 A1* | 5/2009 | Abernathy ........... G02B 6/4433 385/80 |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1* | 6/2009 | Lu ............... G02B 6/3816 385/72 |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1* | 3/2010 | Lochkovic ........... B65H 75/182 385/135 |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1* | 3/2011 | Sugita .............. G02B 6/3807 15/97.1 |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0229098 A1* | 9/2011 | Abernathy ............ G02B 6/447 385/102 |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |

(56) References Cited

U.S. PATENT DOCUMENTS

| | | |
|---|---|---|
| 2013/0034333 A1 | 2/2013 | Holmberg et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0029897 A1* | 1/2014 | Shimazu ............ G02B 6/3879 385/76 |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1* | 6/2014 | Dendas ............... G02B 6/4477 385/76 |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1* | 11/2014 | Daems ................ G02B 6/3889 385/77 |
| 2014/0348467 A1 | 11/2014 | Cote et al. |
| 2014/0355936 A1* | 12/2014 | Bund .................. G02B 6/3888 385/81 |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0144883 A1* | 5/2015 | Sendelweck ......... H01L 21/288 257/29 |
| 2015/0153532 A1 | 6/2015 | Holmberg et al. |
| 2015/0168657 A1* | 6/2015 | Islam ................. G02B 6/4471 385/87 |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1* | 7/2016 | Van Baelen ......... G02B 6/3849 |
| 2016/0209602 A1 | 7/2016 | Theuerkorn |
| 2016/0209605 A1* | 7/2016 | Lu ...................... G02B 6/3897 |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2017/0023758 A1 | 1/2017 | Reagan et al. |
| 2017/0038538 A1* | 2/2017 | Isenhour .............. G02B 6/4471 |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1* | 6/2017 | Lin .................... G02B 6/3887 |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1* | 6/2017 | Marple ............... G02B 6/3874 |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1* | 12/2017 | Watanabe ........... G02B 6/3893 |
| 2018/0031774 A1 | 2/2018 | Van et al. |
| 2018/0079569 A1 | 3/2018 | Simpson |
| 2018/0081127 A1* | 3/2018 | Coenegracht ....... G02B 6/3877 |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267243 A1* | 9/2018 | Nhep .................. G02B 6/2551 |
| 2018/0267265 A1 | 9/2018 | Zhang et al. |
| 2018/0329149 A1 | 11/2018 | Mullaney et al. |
| 2018/0348447 A1 | 12/2018 | Nhep et al. |
| 2018/0372962 A1 | 12/2018 | Isenhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1* | 1/2019 | Rosson ............... G02B 6/3825 |
| 2019/0004258 A1 | 1/2019 | Dannoux et al. |
| 2019/0011641 A1 | 1/2019 | Isenhour et al. |
| 2019/0018210 A1 | 1/2019 | Coan et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1* | 5/2019 | Harney ............... H04W 4/80 235/375 |
| 2019/0162910 A1* | 5/2019 | Gurreri ............... G02B 6/38 |

(56) References Cited

U.S. PATENT DOCUMENTS

| | | | |
|---|---|---|---|
| 2019/0162914 A1* | 5/2019 | Baca | G02B 6/3826 |
| 2019/0170961 A1 | 6/2019 | Coenegracht et al. | |
| 2019/0187396 A1* | 6/2019 | Finnegan | G02B 6/4472 |
| 2019/0235177 A1 | 8/2019 | Lu et al. | |
| 2019/0250338 A1 | 8/2019 | Mullaney et al. | |
| 2019/0271817 A1 | 9/2019 | Coenegracht | |
| 2019/0324217 A1 | 10/2019 | Lu et al. | |
| 2019/0339460 A1 | 11/2019 | Dannoux et al. | |
| 2019/0339461 A1 | 11/2019 | Dannoux et al. | |
| 2019/0369336 A1 | 12/2019 | Van et al. | |
| 2019/0369345 A1 | 12/2019 | Reagan et al. | |
| 2019/0374637 A1 | 12/2019 | Siadak et al. | |
| 2020/0012051 A1 | 1/2020 | Coenegracht et al. | |
| 2020/0036101 A1 | 1/2020 | Scheucher | |
| 2020/0049922 A1 | 2/2020 | Rosson | |
| 2020/0057205 A1 | 2/2020 | Dannoux et al. | |
| 2020/0057222 A1 | 2/2020 | Dannoux et al. | |
| 2020/0057223 A1 | 2/2020 | Dannoux et al. | |
| 2020/0057224 A1 | 2/2020 | Dannoux et al. | |
| 2020/0057723 A1 | 2/2020 | Chirca et al. | |
| 2020/0096705 A1 | 3/2020 | Rosson | |
| 2020/0096709 A1 | 3/2020 | Rosson | |
| 2020/0096710 A1 | 3/2020 | Rosson | |
| 2020/0103599 A1 | 4/2020 | Rosson | |
| 2020/0103608 A1 | 4/2020 | Hill et al. | |
| 2020/0110229 A1 | 4/2020 | Dannoux et al. | |
| 2020/0110234 A1 | 4/2020 | Holmberg et al. | |
| 2020/0116949 A1 | 4/2020 | Rosson | |
| 2020/0116952 A1 | 4/2020 | Rosson | |
| 2020/0116953 A1 | 4/2020 | Rosson | |
| 2020/0116954 A1 | 4/2020 | Rosson | |
| 2020/0116958 A1 | 4/2020 | Dannoux et al. | |
| 2020/0116962 A1 | 4/2020 | Dannoux et al. | |
| 2020/0124805 A1* | 4/2020 | Rosson | G02B 6/3897 |
| 2020/0124812 A1 | 4/2020 | Dannoux et al. | |
| 2020/0132939 A1 | 4/2020 | Coenegracht et al. | |
| 2020/0192042 A1 | 6/2020 | Coan et al. | |
| 2020/0209492 A1 | 7/2020 | Rosson | |
| 2020/0218017 A1 | 7/2020 | Coenegracht | |
| 2020/0225422 A1 | 7/2020 | Van et al. | |
| 2020/0225424 A1 | 7/2020 | Coenegracht | |
| 2020/0241211 A1 | 7/2020 | Shonkwiler et al. | |
| 2020/0348476 A1 | 11/2020 | Hill et al. | |
| 2020/0371306 A1* | 11/2020 | Mosier | G02B 6/4403 |
| 2020/0393629 A1 | 12/2020 | Hill et al. | |

FOREIGN PATENT DOCUMENTS

| | | |
|---|---|---|
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 104064903 A | 9/2014 |
| CN | 104280830 A | 1/2015 |
| CN | 104603656 A | 5/2015 |
| CN | 105467529 A | 4/2016 |
| CN | 105683795 A | 6/2016 |
| CN | 110954996 A | 4/2020 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0026553 A1 | 4/1981 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0547788 A1 | 6/1993 |
| EP | 0762171 A1 | 3/1997 |
| EP | 0782025 A1 | 7/1997 |
| EP | 0855610 A2 | 7/1998 |
| EP | 0856751 A1 | 8/1998 |
| EP | 0856761 A1 | 8/1998 |
| EP | 0940700 A2 | 9/1999 |
| EP | 0949522 A2 | 10/1999 |
| EP | 0957381 A1 | 11/1999 |
| EP | 0997757 A2 | 5/2000 |
| EP | 1065542 A1 | 1/2001 |
| EP | 1122566 A2 | 8/2001 |
| EP | 1243957 A2 | 9/2002 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 B1 | 12/2016 |
| EP | 3207223 A1 | 8/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| ES | 1184287 U | 5/2017 |
| FR | 2485754 A1 | 12/1981 |
| GB | 2022284 A | 12/1979 |
| GB | 2154333 A | 9/1985 |
| GB | 2169094 A | 7/1986 |
| JP | 52-030447 A | 3/1977 |
| JP | 58-142308 A | 8/1983 |
| JP | 61-145509 A | 7/1986 |
| JP | 62-054204 A | 3/1987 |
| JP | 63-020111 A | 1/1988 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-106765 A | 4/1993 |

(56) References Cited

FOREIGN PATENT DOCUMENTS

| | | |
|---|---|---|
| JP | 05-142439 A | 6/1993 |
| JP | 05-297246 A | 11/1993 |
| JP | 06-320111 A | 11/1994 |
| JP | 07-318758 A | 12/1995 |
| JP | 08-050211 A | 2/1996 |
| JP | 08-054522 A | 2/1996 |
| JP | 08-062432 A | 3/1996 |
| JP | 08-292331 A | 11/1996 |
| JP | 09-049942 A | 2/1997 |
| JP | 09-135526 A | 5/1997 |
| JP | 09-159867 A | 6/1997 |
| JP | 09-203831 A | 8/1997 |
| JP | 09-325223 A | 12/1997 |
| JP | 09-325249 A | 12/1997 |
| JP | 10-170781 A | 6/1998 |
| JP | 10-332953 A | 12/1998 |
| JP | 10-339826 A | 12/1998 |
| JP | 11-064682 A | 3/1999 |
| JP | 11-119064 A | 4/1999 |
| JP | 11-248979 A | 9/1999 |
| JP | 11-271582 A | 10/1999 |
| JP | 11-281861 A | 10/1999 |
| JP | 11-326693 A | 11/1999 |
| JP | 11-337768 A | 12/1999 |
| JP | 11-352368 A | 12/1999 |
| JP | 2000-002828 A | 1/2000 |
| JP | 2001-116968 A | 4/2001 |
| JP | 2001-290051 A | 10/2001 |
| JP | 2002-520987 A | 7/2002 |
| JP | 2002-250987 A | 9/2002 |
| JP | 2003-009331 A | 1/2003 |
| JP | 2003-070143 A | 3/2003 |
| JP | 2003-121699 A | 4/2003 |
| JP | 2003-177279 A | 6/2003 |
| JP | 2003-302561 A | 10/2003 |
| JP | 2004-361521 A | 12/2004 |
| JP | 2005-024789 A | 1/2005 |
| JP | 2005-031544 A | 2/2005 |
| JP | 2005-077591 A | 3/2005 |
| JP | 2005-114860 A | 4/2005 |
| JP | 2005-520987 A | 7/2005 |
| JP | 2006-023502 A | 1/2006 |
| JP | 2006-146084 A | 6/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-033698 A | 2/2011 |
| JP | 2013-041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207223 U | 11/2016 |
| JP | 3207233 U | 11/2016 |
| KR | 10-2013-0081087 A | 7/2013 |
| TW | 222688 B | 4/1994 |
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2013/177016 A1 | 11/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | WO-2015009435 A1 * | 1/2015 ........... G02B 6/3825 |
| WO | 2015/144883 A1 | 10/2015 |
| WO | 2015/047508 A1 | 12/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | WO-2016156610 A1 * | 10/2016 ........... G02B 6/3825 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/006176 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Chinese Patent Application No. 201780094279.6, Office Action dated Jul. 23, 2021, 5 pages (English Translation Only), Chinese Patent Office.

(56) References Cited

OTHER PUBLICATIONS

Chinese Patent Application No. 201780094420.2, Office Action dated Apr. 28, 2021, 22 pages (4 pages of English Translation and 18 pages of Original Document), Chinese Patent Office.
Chinese Patent Application No. 201880056459.X, Office Action dated Apr. 14, 2021, 8 pages (4 pages of English Translation and 4 pages of Original Document), Chinese Patent Office.
Chinese Patent Application No. 201780094432.5, Office Action dated Apr. 19, 2021, 7 pages (5 pages of English Translation and 2 pages of Original Document), Chinese Patent Office.
Chinese Patent Application No. 201780094436.3, Office Action dated Apr. 6, 2021, 21 pages (5 pages of English Translation and 16 pages of Original Document), Chinese Patent Office.
Chinese Patent Application No. 201880048258.5, Office Action dated Mar. 18, 2021, 10 pages (English Translation Only); Chinese Patent Office.
Clearfield, "Fieldshield Optical Fiber Protection System: Installation Manual." for part No. 016164. Last Updated Dec. 2014. 37 pgs.
Clearfield, "FieldShield SC and LC Pushable Connectors," Last Updated Jun. 1, 2018, 2 pgs.
Clearfield, "FieldShield SmarTerminal: Hardened Pushable Connectors" Last Updated Jun. 29, 2018, 2 pgs.
Coaxum, L., et al., U.S. Appl. No. 62/341,947, "Fiber Optic Multiport Having Different Types of Ports for Multi-Use," filed May 26, 2016.
Corning Cable Systems, "SST Figure-8 Drop Cables 1-12 Fibers", Preliminary Product Specifications, 11 pgs. (2002).
Corning Cable Systems, "SST-Drop (armor) Cables 1-12 Fibers", Product Specifications, 2 pgs. (2002).
Corning Cable Systems, "SST-Drop (Dielectric) Cables 1-12 Fibers", Product Specifications, 2 pgs. (2002).
European Patent Application No. 17817578.2 Office Action dated Nov. 6, 2020; 6 Pages; European Patent Office.
European Patent Application No. 17817582.4 Office Action dated Nov. 30, 2020; 6 Pages; European Patent Office.
European Patent Application No. 18738183.5 Communication Pursuant to Article 94(3) EPC, dated Oct. 15, 2021; 7 pages; European Patent Office.
Faulkner et al. "Optical networks for local lopp applications, J. Lightwave Technol.0733-8724 7(11), 17411751 (1989)."
Fiber Systems International: Fiber Optic Solutions, data, "TFOCA-II 4-Channel Fiber Optic Connector" sheet. 2 pgs.
Infolite—Design and Data Specifications, 1 pg. Retrieved Feb. 21, 2019.
International Preliminary Report on Patentability of the International Searching Authority; PCT/US17/063862; dated Jan. 9, 2020; 11 Pages; European Patent Office.
International Preliminary Report on Patentability of the International Searching Authority; PCT/US17/064063; dated Jan. 9, 2020; 16 Pages; European Patent Office.
International Preliminary Report on Patentability of the International Searching Authority; PCT/US17/064072; dated Jan. 9, 2020; 16 Pages; European Patent Office.
International Preliminary Report on Patentability of the International Searching Authority; PCT/US18/039019; dated Jun. 11, 2020; 11 Pages; European Patent Office.
International Preliminary Report on Patentability of the International Searching Authority; PCT/US18/039490; dated Jan. 9, 2020; 11 Pages; European Patent Office.
International Preliminary Report on Patentability of the International Searching Authority; PCT/US18/040130; dated Jan. 9, 2020; 12 Pages; European Patent Office.
International Preliminary Report on Patentability of the International Searching Authority; PCT/US2017/063938; dated Jan. 9, 2020; 15 Pages; European Patent Office.
International Preliminary Report on Patentability of the International Searching Authority; PCT/US2017/063953; dated Jan. 9, 2020; 15 Pages; European Patent Office.
International Preliminary Report on Patentability of the International Searching Authority; PCT/US2017/063991; dated Jan. 9, 2020; 12 Pages; European Patent Office.
International Preliminary Report on Patentability of the International Searching Authority; PCT/US2017/064027; dated Jan. 9, 2020; 26 Pages; European Patent Office.
International Preliminary Report on Patentability of the International Searching Authority; PCT/US2018/039484; dated Jan. 9, 2020; 10 Pages; European Patent Office.
International Preliminary Report on Patentability of the International Searching Authority; PCT/US2018/039485; dated Jan. 9, 2020; 8 Pages; European Patent Office.
International Search Report and Writen Opinion PCT/US2017/063938 dated May 14, 2018.
International Search Report and Writen Opinion PCT/US2017/063953 dated May 14, 2018.
International Search Report and Writen Opinion PCT/US2017/063991 dated May 14, 2018.
International Search Report and Writen Opinion PCT/US2017/064027 dated Oct. 9, 2018.
International Search Report and Writen Opinion PCT/US2017/064063 dated May 15, 2018.
International Search Report and Writen Opinion PCT/US2017/064071 dated May 14, 2018.
International Search Report and Writen Opinion PCT/US2017/064072 dated May 14, 2018.
International Search Report and Writen Opinion PCT/US2017/064077 dated Feb. 26, 2018.
International Search Report and Writen Opinion PCT/US2017/064084 dated Feb. 26, 2018.
International Search Report and Writen Opinion PCT/US2017/064087 dated Feb. 26, 2018.
International Search Report and Writen Opinion PCT/US2017/064092 dated Feb. 23, 2018.
International Search Report and Writen Opinion PCT/US2017/064093 dated Feb. 26, 2018.
International Search Report and Writen Opinion PCT/US2017/064095 dated Feb. 23, 2018.
International Search Report and Writen Opinion PCT/US2017/064096 dated Feb. 26, 2018.
International Search Report and Writen Opinion PCT/US2018/039019 dated Sep. 18, 2018.
International Search Report and Writen Opinion PCT/US2018/039490 dated Oct. 4, 2018.
International Search Report and Writen Opinion PCT/US2018/039494 dated Oct. 11, 2018.
International Search Report and Writen Opinion PCT/US2018/040011 dated Oct. 5, 2018.
International Search Report and Writen Opinion PCT/US2018/040104 dated Oct. 9, 2018.
International Search Report and Writen Opinion PCT/US2018/040126 dated Oct. 9, 2018.
International Search Report and Writen Opinion PCT/US2018/040130 dated Sep. 18, 2018.
International Search Report and Written Opinion of the International Searching Authority; PCT/US17/063938; dated May 14, 2018; 19 Pages; European Patent Office.
International Search Report and Written Opinion of the International Searching Authority; PCT/US18/039485; dated Dec. 13, 2018; 10 Pages; European Patent Office.
International Search Report and Written Opinion of the International Searching Authority; PCT/US2018/039020; dated Mar. 8, 2019; 15 Pages; European Patent Office.
International Search Report and Written Opinion of the International Searching Authority; PCT/US2018/039484; dated Oct. 5, 2018; 11 Pages; European Patent Office.
International Search Report and Written Opinion of the International Searching Authority; PCT/US2019/024929; dated Aug. 5, 2019; 12 Pages; European Patent Office.

(56) References Cited

OTHER PUBLICATIONS

International Search Report and Written Opinion of the International Searching Authority; PCT/US2021/032904; dated Aug. 25, 2021; 16 pages; European Patent Office.
International Search Report and Written Opinion PCT/US2018/039485 dated Dec. 13, 2018.
International Search Report received for International Patent Application Serial No. PCT/US2017/063862 dated Feb. 4, 2019.
Nawata, "Multimode and Single-Mode Fiber Connectors Technology"; IEEE Journal of Quantum Electronics, vol. QE-16, No. 6 Published Jun. 1980.
Notice of Allowance for U.S. Appl. No. 16/018,997, filed Oct. 4, 2018.
Office Action for U.S. Appl. No. 16/018,988, filed Oct. 31, 2018.
Office Action pertaining to U.S. Appl. No. 16/018,918 dated Sep. 28, 2018.
Office Action pertaining to U.S. Appl. No. 16/019,008 dated Oct. 31, 2018.
Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Schneier, Bruce; "Applied Cryptography: Protocols, Algorithms, and Source Code in C," Book. 1995 Sec. 10.3, 12.2, 165 Pgs.
Stratos: Lightwave., "Innovation Brought to Light", Hybrid HMA Series, Hybrid Multi Application, 2 pgs.
Stratos: Ughtwave., "Innovation Brought to Light", Hybrid HMA Series, Hybrid Multi Application, 2 pgs.
Wang et al. "Opto-VLSI-based dynamic optical splitter," Electron. Lett.0013-5194 10.1049/el:20046715 40(22), 14451446 (2004).
Wang et al. "Opto-VLSI-based dynamic optical splitter," Electron. Lett.0013-5194 10.1049/el:120046715 40(22), F14451446 (2004).
Xiao et al. "1 xN wavelength selective adaptive optical power splitter for wavelength-division-multiplexed passive optical networks," Optics & Laser Technology 68, pp. 160-164, May 2015.

\* cited by examiner

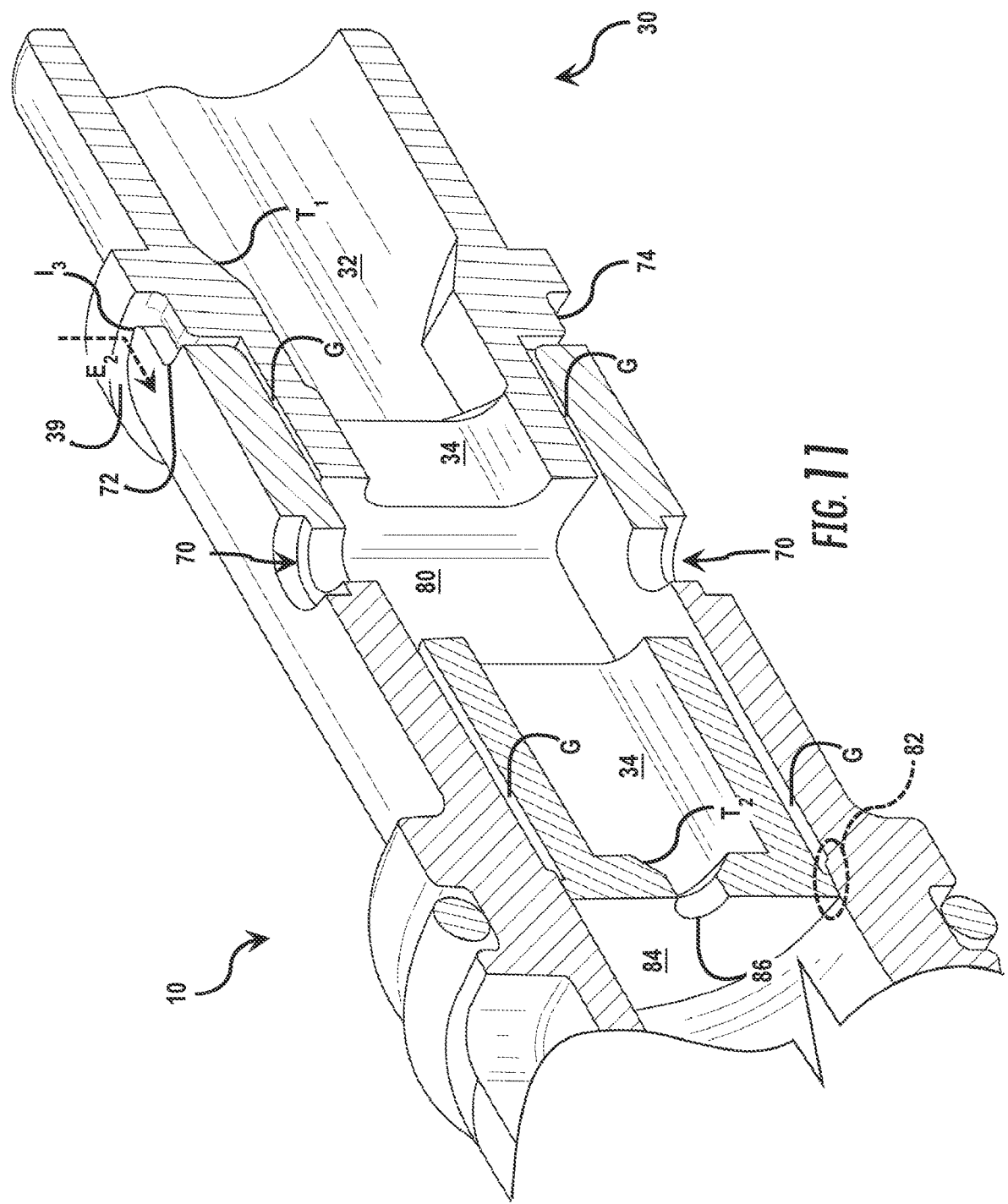

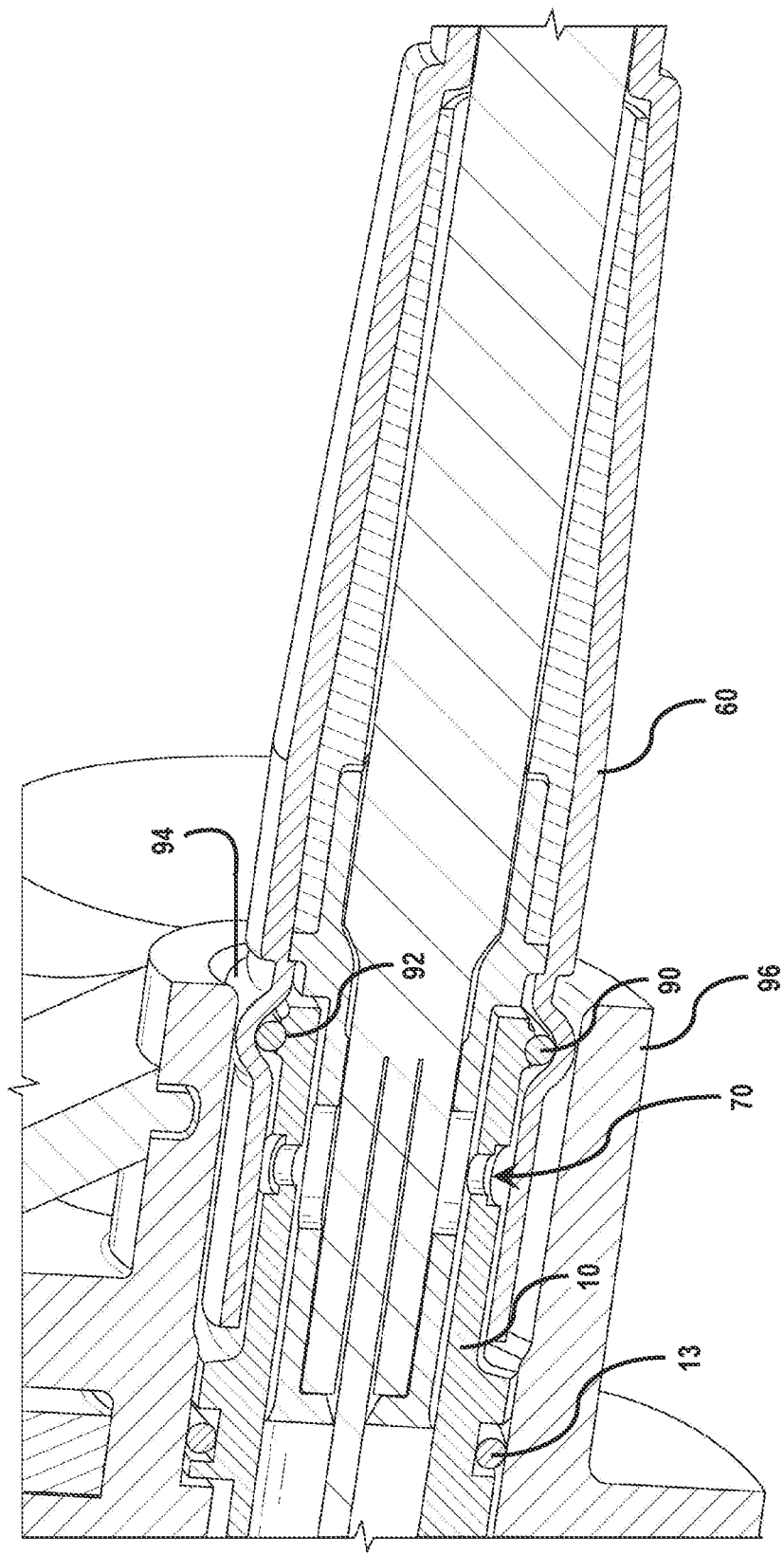

FIBER OPTIC CONNECTORS AND CONNECTORIZATION EMPLOYING ADHESIVE ADMITTING ADAPTERS

CROSS-REFERENCE TO RELATED APPLICATIONS

The present application is a continuation of U.S. patent application Ser. No. 16/814,461, filed Mar. 10, 2020, which is a continuation of U.S. patent application Ser. No. 16/015,588, now U.S. Pat. No. 10,605,998 B1, filed Jun. 22, 2018, which was filed under 35 U.S.C. 111(a) as a continuation-in-part of International Patent Application No. PCT/US2017/064063, filed Nov. 30, 2017. U.S. patent application Ser. No. 16/015,588, filed Jun. 22, 2018, also claims priority to U.S. Provisional Ser. No. 62/526,011, filed Jun. 28, 2017, U.S. Provisional Ser. No. 62/526,195, filed Jun. 28, 2017, and U.S. Provisional Ser. No. 62/526,018, filed Jun. 28, 2017.

BACKGROUND

Field

The present disclosure relates generally to assemblies for interconnecting or otherwise terminating optical fibers and fiber optic cables in a manner suitable for mating with corresponding optical receptacles.

Technical Background

Optical fibers are used in an increasing number and variety of applications, such as a wide variety of telecommunications and data transmission applications. As a result, fiber optic networks include an ever increasing number of terminated optical fibers and fiber optic cables that can be conveniently and reliably mated with corresponding optical receptacles in the network. These terminated optical fibers and fiber optic cables are available in a variety of connectorized formats including, for example, hardened OptiTap® and OptiTip® connectors, field-installable UniCam® connectors, preconnectorized single or multi-fiber cable assemblies with SC, FC, or LC connectors, etc., all of which are available from Corning Incorporated, with similar products available from other manufacturers, as is well documented in the patent literature.

The optical receptacles with which the aforementioned terminated fibers and cables are coupled are commonly provided at optical network units (ONUs), network interface devices (NIDs), and other types of network devices or enclosures, and often require hardware that is sufficiently robust to be employed in a variety of environments under a variety of installation conditions. These conditions may be attributable to the environment in which the connectors are employed, or the habits of the technicians handling the hardware. Consequently, there is a continuing drive to enhance the robustness of these connectorized assemblies, while preserving quick, reliable, and trouble-free optical connection to the network.

BRIEF SUMMARY

According to the subject matter of the present disclosure, fiber optic connectors, connectorized cable assemblies, and methods for the connectorization of cable assemblies are provided. In accordance with a first variety of embodiments of the present disclosure, connectorized fiber optic cable assemblies are provided comprising a connector housing, a ferrule, a cable adapter, an adapter extension, a fiber optic cable, and a multi-diametrical sealing flexure. The connector housing comprises a ferrule retaining portion, an adapter seating portion, and a longitudinal axis extending through the ferrule retaining portion of the connector housing and the adapter seating portion of the connector housing. The ferrule is retained by the ferrule retaining portion of the connector housing and comprises an optical fiber bore. The cable adapter comprises an optical cable passageway, an optical fiber passageway, an extension securement portion, a housing insert portion seated in the adapter seating portion of the connector housing, and an adapter abutment positioned between the extension securement portion and the housing insert portion. The adapter extension is secured to the extension securement portion of the cable adapter and comprises an extended cable passageway. The fiber optic cable extends along the extended cable passageway of the adapter extension and the optical cable passageway of the cable adapter and comprises an optical fiber extending along optical fiber passageway of the cable adapter to the optical fiber bore of the ferrule. The multi-diametrical sealing flexure comprises a cable engaging portion engaging an outer cable surface of the fiber optic cable, a housing engaging portion engaging an outer housing surface of the connector housing, and an intermediate flexure portion extending from the cable engaging portion to the housing engaging portion and engaging an outer extension surface of the adapter extension.

In accordance with additional embodiments of the present disclosure, the adapter extension may be integrated with the cable adapter, e.g., as a unitary molded part.

In accordance with still further embodiments of the present disclosure, fiber optic connectors are provided comprising a connector housing, a ferrule, a cable adapter, and an adapter extension. The adapter extension is integrated with, or structurally configured to be secured to, the extension securement portion of the cable adapter and comprises an extended cable passageway. The adapter abutment and the connector housing are structurally configured to form an adapter sealing interface where the adapter abutment contacts an abutment facing surface of the connector housing. The adapter sealing interface forms a non-destructive flexural relief point along a length of the longitudinal axis. The adapter sealing interface originates at a housing-to-adapter elbow comprising an exposed anchoring face oriented towards the ferrule retaining portion of the connector housing.

In accordance with still further embodiments of the present disclosure, methods of connectorizing fiber optic cables are provided where a cable adapter is seated in the adapter seating portion of the connector housing with the adapter abutment limiting an extent to which the cable adapter extends into the adapter seating portion of the connector housing. The adapter extension is secured to the extension securement portion of the cable adapter and a fiber optic cable is extended along the extended cable passageway of the adapter extension and the optical cable passageway of the cable adapter. The fiber optic cable comprises an optical fiber extending along optical fiber passageway of the cable adapter to the optical fiber bore of the ferrule. An outer cable surface of the fiber optic cable, an outer housing surface of the connector housing, and an outer extension surface of the adapter extension are engaged with a multi-diametrical sealing flexure comprising a cable engaging portion, a housing engaging portion, and an intermediate flexure portion extending from the cable engaging portion to the housing engaging portion.

In accordance with additional embodiments of the present disclosure, connectorized fiber optic cable assemblies are provided comprising a multi-diametrical sealing flexure and a subcutaneous sealing element. The multi-diametrical sealing flexure comprises a cable engaging portion engaging an outer cable surface of the fiber optic cable and a housing engaging portion engaging an outer housing surface of the connector housing. The subcutaneous sealing element is positioned between an outer surface of the connector housing and an inner surface of the multi-diametrical sealing flexure to bound an entire rotational periphery of the connector housing about the longitudinal axis of the connector housing and form an annular projection in an outer surface of the multi-diametrical sealing flexure.

In accordance with alternative embodiments of the present disclosure, fiber optic connectors are provided comprising a connector housing and a cable adapter where the cable adapter comprises an optical cable passageway, an optical fiber passageway, a housing insert portion, an adhesive window, and an adapter abutment. The housing insert portion is structurally configured to be seated in the adapter seating portion of the connector housing to align the optical cable passageway and the optical fiber passageway with the longitudinal axis of the connector housing. The adhesive window resides in the housing insert portion in communication with the optical fiber passageway. The adapter abutment and the connector housing are structurally configured to form an adapter sealing interface where the adapter abutment contacts an abutment facing surface of the connector housing, and the cable adapter and the connector housing are structurally configured to form complementary keying surfaces that are positioned to align the adhesive injection port of the connector housing with the adhesive window of the cable adapter.

In accordance with further alternative embodiments of the present disclosure, connectorized fiber optic cable assemblies are provided comprising a connector housing, a ferrule, a cable adapter, and a fiber optic cable. The cable adapter comprises an adhesive window and the cable adapter and the connector housing are structurally configured to form complementary keying surfaces that are positioned to align the adhesive injection port of the connector housing with the adhesive window of the cable adapter. The optical fiber crosses the adhesive window of the cable adapter in a fiber potting portion of the optical fiber passageway of the cable adapter.

In accordance with still further alternative embodiments of the present disclosure, methods of connectorizing fiber optic cables are provided where the complementary keying surfaces formed by the cable adapter and the connector housing are aligned and the cable adapter is seated in the adapter seating portion of the connector housing to align the adhesive injection port of the connector housing with the adhesive window of the cable adapter. A fiber optic cable is extended along the optical cable passageway of the cable adapter and the longitudinal axis of the connector housing into the ferrule retaining portion of the connector housing such that the optical fiber crosses the adhesive window of the cable adapter in a fiber potting portion of the optical fiber passageway of the cable adapter. A ferrule is positioned along an end portion of the optical fiber and is retained in the ferrule retaining portion of the connector housing. An adhesive is injected through the adhesive injection port of the connector housing, into the adhesive window of the cable adapter to secure the cable adapter in the connector housing and the optical fiber in the cable adapter.

In accordance with additional alternative embodiments of the present disclosure, fiber optic connectors are provided comprising a connector housing and a cable adapter, where an interior surface of the connector housing and an exterior surface of the cable adapter form a capillary gap when the housing insert portion of the cable adapter is seated in the adapter seating portion of the connector housing. The the capillary gap is displaced from the longitudinal axis of the connector housing from the adapter sealing interface to an adhesive barrier formed by portions of the cable adapter and the connector housing when the housing insert portion of the cable adapter is seated in the adapter seating portion of the connector housing.

In accordance with further alternative embodiments of the present disclosure, a connector housing is provided comprising a ferrule retaining portion, a keying portion, a sealing element retaining portion, and an adhesive injection port where the adhesive injection port is defined in a potting portion of the connector housing and is separated from the ferrule retaining portion of the connector housing and the keying portion of the connector housing by the sealing element retaining portion of the connector housing, along the longitudinal axis of the connector housing.

Although the concepts of the present disclosure are described herein with reference to a set of drawings that show a particular type of fiber optic cable, and connector components of particular size and shape, it is contemplated that the concepts may be employed in any optical fiber connectorization scheme including, for example, and without limitation, hardened OptiTap® and OptiTip® connectors, field-installable UniCam® connectors, single or multi-fiber cable assemblies with SC, FC, LC, or multi-fiber connectors, etc.

BRIEF DESCRIPTION OF THE SEVERAL
VIEWS OF THE DRAWINGS

The following detailed description of specific embodiments of the present disclosure can be best understood when read in conjunction with the following drawings, where like structure is indicated with like reference numerals and in which:

FIG. 4A is an exploded view of selected components of FIG. 4;

FIG. 11 illustrates the manner in which a cable adapter may interface with a connector housing according to embodiments of the present disclosure; and FIG. 12 illustrates the use of a subcutaneous sealing element in a connectorized cable assembly of the present disclosure.

DETAILED DESCRIPTION

Figure 1:
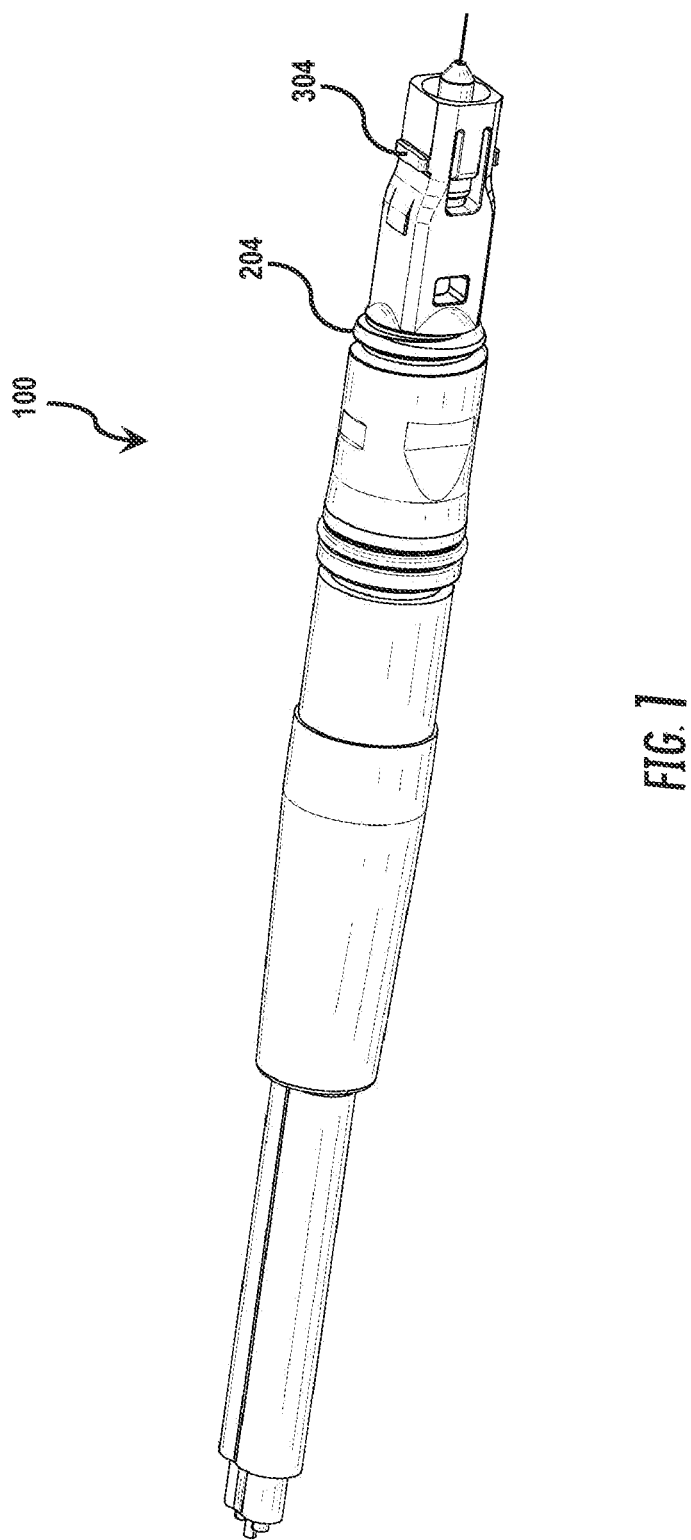
FIG. 1 illustrates a connectorized cable assembly according to one embodiment of the present disclosure.
Figure 2:
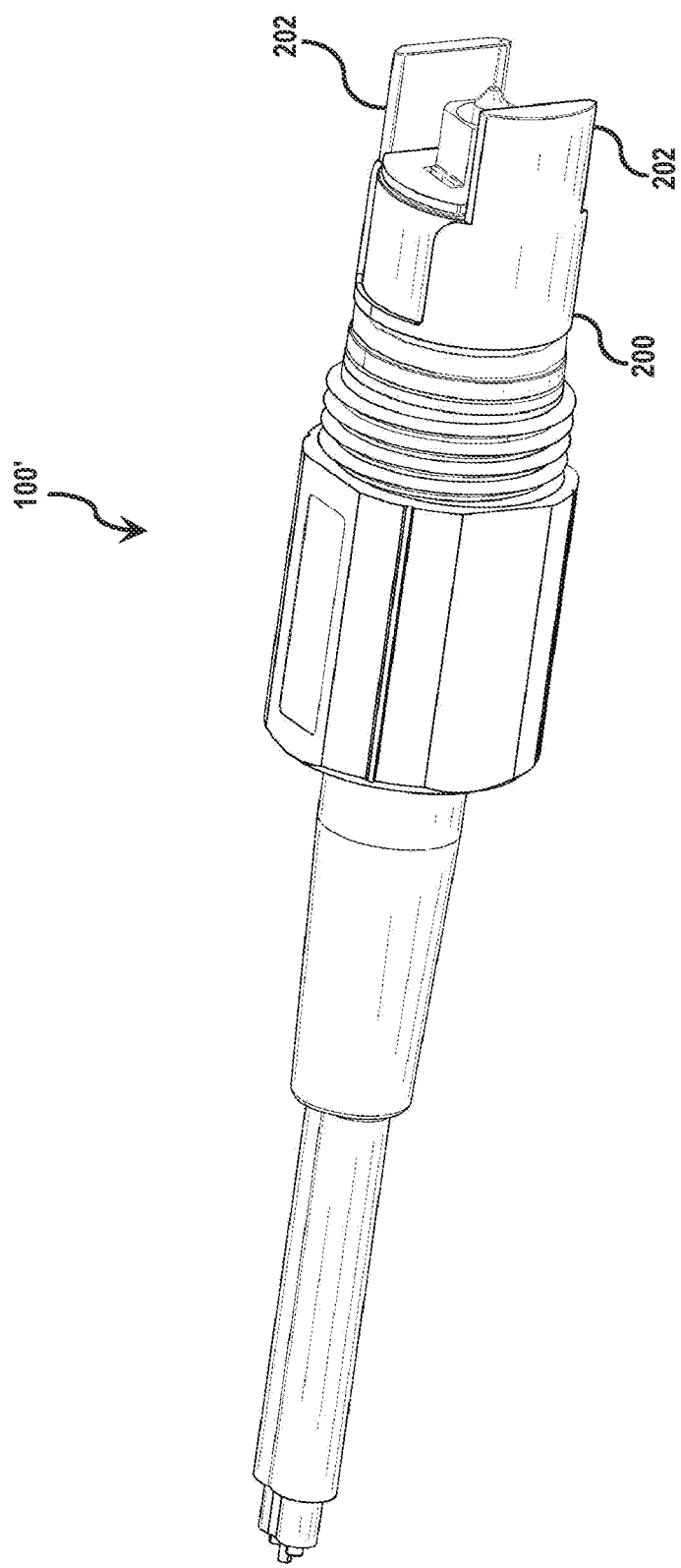
FIG. 2 illustrates a connectorized cable assembly employing a hardened OptiTap optical connector.
Figure 3:
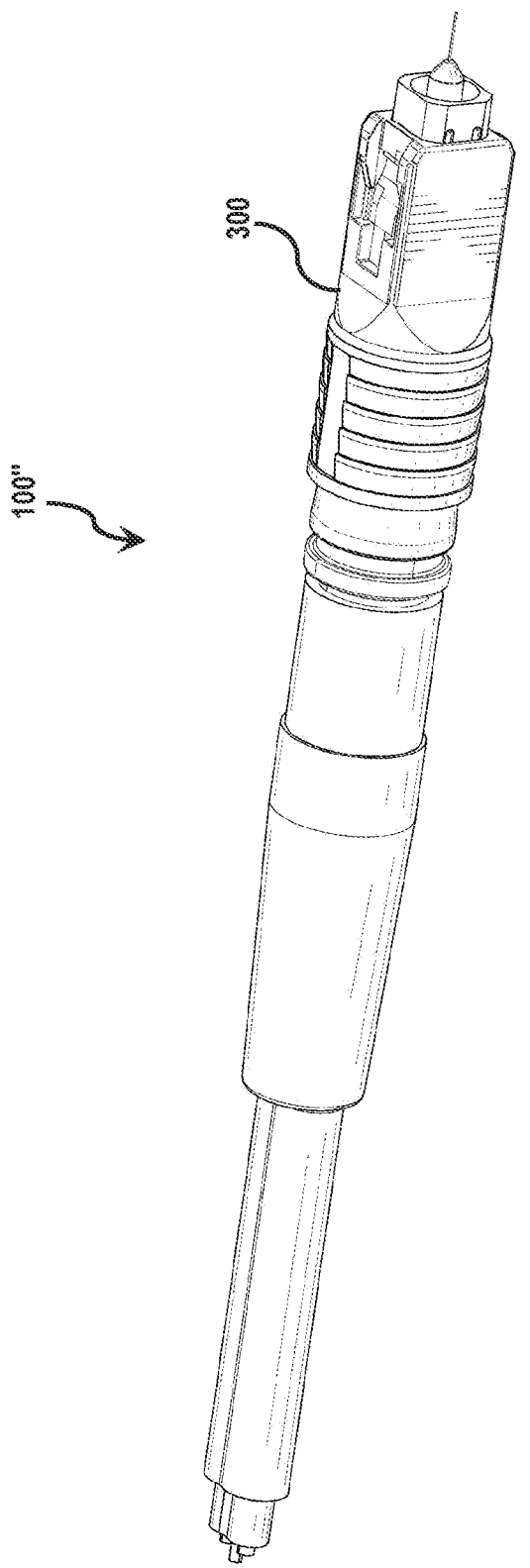
FIG. 3 illustrates a connectorized cable assembly employing a type SC optical connector.

Referring initially to FIGS. 1-3, as is noted above, the connectorization concepts of the present disclosure may be employed in a variety of optical fiber connectorization schemes including, for example, and without limitation, hardened OptiTap® and OptiTip® connectors, field-installable UniCam® connectors, single or multi-fiber cable assemblies with SC, FC, LC, or multi-fiber connectors, etc. To help illustrate this point, FIG. 1 illustrates a connectorized cable assembly 100 according to an embodiment of the present disclosure where the connectorized cable assembly defines a customized connectorization profile that is particularly well suited to interface with an optical connectorization terminal comprising a plurality of relatively closely packed connection ports.

Although the following description presents the concepts of the present disclosure in the context of the connectorized cable assembly 100 illustrated in FIG. 1, it is contemplated that the concepts of the present disclosure will enjoy equal applicability to any of a variety of cable assembly types. For example, and not by way of limitation, FIG. 2 illustrates a connectorized cable assembly 100' employing a conversion housing 200 for a hardened optical connector, one embodiment of which is available under the trade name OptiTap®. OptiTap® type conversion housings 200, and some other hardened connector conversion housings, will comprise a pair of opposing fingers 202 comprising opposing interior faces that extend parallel to, and are arranged symmetrically about, the longitudinal axis of the connector housing. The finger spacing between the opposing interior faces of the opposing fingers 202 is between 10.80 millimeters and 10.85 millimeters. finger depth along a direction parallel to the longitudinal axis of the connector housing is between 8.45 millimeters and 8.55 millimeters. The finger width along a direction perpendicular to the finger depth and the longitudinal axis of the connector housing is less than 10 millimeters. The outer faces of the opposing fingers lie along a common outside diameter of between 15.75 millimeters and 15.85 millimeters, and the outer face of one of the opposing fingers is truncated in a plane parallel to the opposing interior faces to define a truncated span extending from the outer face of the truncated opposing finger to the outer face of the opposite finger of between about 14.75 millimeters and about 14.95 millimeters. This truncation provides a keying functionality when the connector is paired with a connection port with complementary keying surfaces.

As a further non-limiting example, FIG. 3 illustrates a connectorized cable assembly 100" employing a type SC conversion housing 300. Type SC conversion housings are characterized by a connector footprint as set forth in IEC 61754-4, published by the International Electrical Commission, which defines the standard interface dimensions for the type SC family of fiber optic connectors and may be updated periodically. As is noted in the aforementioned standard, the parent connector for the type SC connector family is a single position plug connector which is characterized by a 2.5 millimeters nominal ferrule diameter. It includes a push-pull coupling mechanism which is spring loaded relative to the ferrule in the direction of the optical axis. The plug has a single male key which may be used to orient and limit the relative position between the connector and the component to which it is mated. The optical alignment mechanism of the connector is of a resilient sleeve style. IEC 61754-4 defines the standard interface dimensions of active device receptacles for the type SC connectors. The receptacles are used to retain the connector plug and mechanically maintain the optical datum target of the plugs at a defined position within the receptacle housings. The SC connector standard encompasses simplex plug connector interfaces, simplex adaptor connector interfaces, duplex plug connector interfaces, and duplex adaptor connector interfaces.

Figure 4:
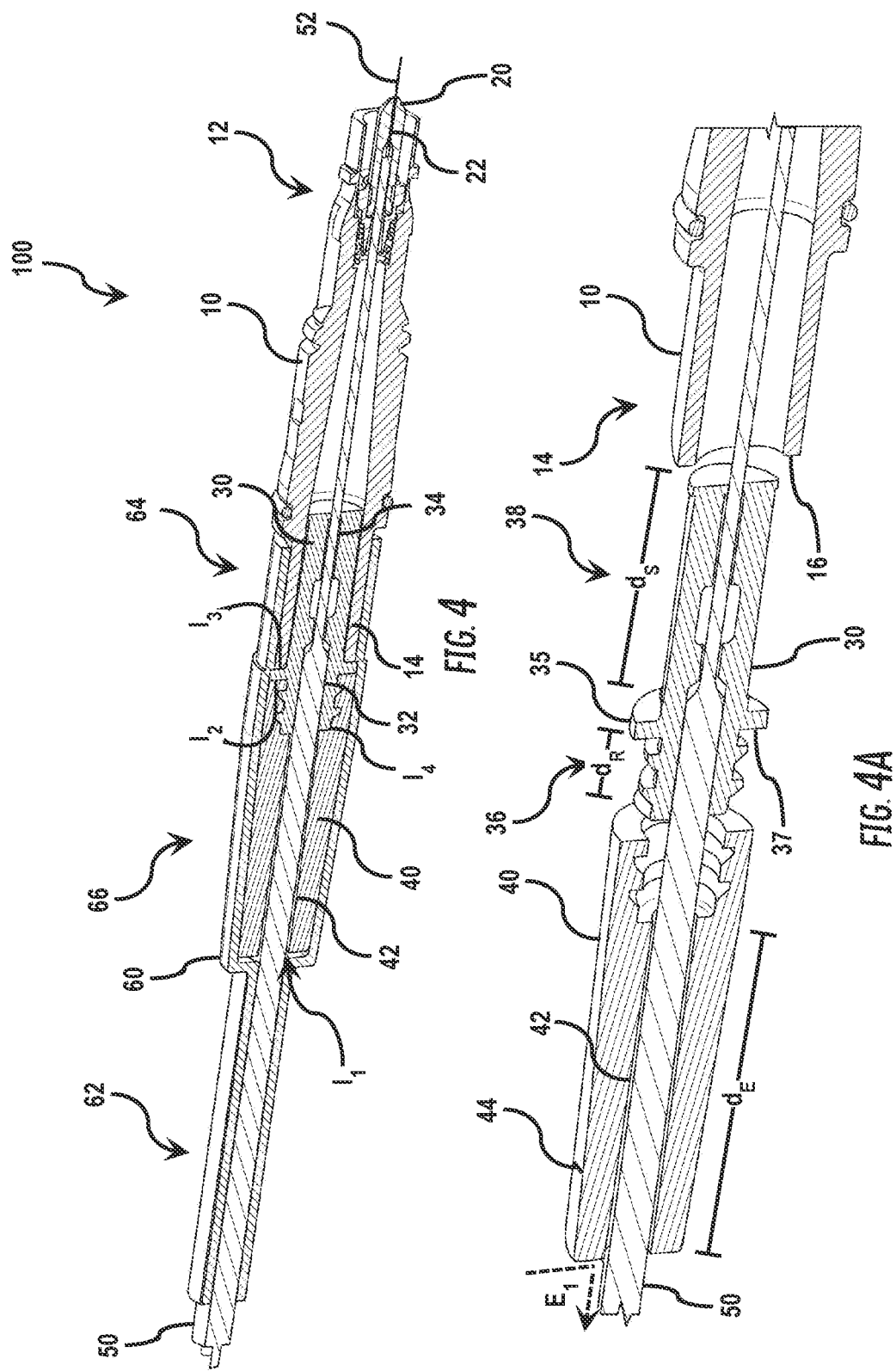
FIG. 4 is a cross-sectional illustration of the connectorized fiber optic cable assembly of FIG. 1.
Figure 6:
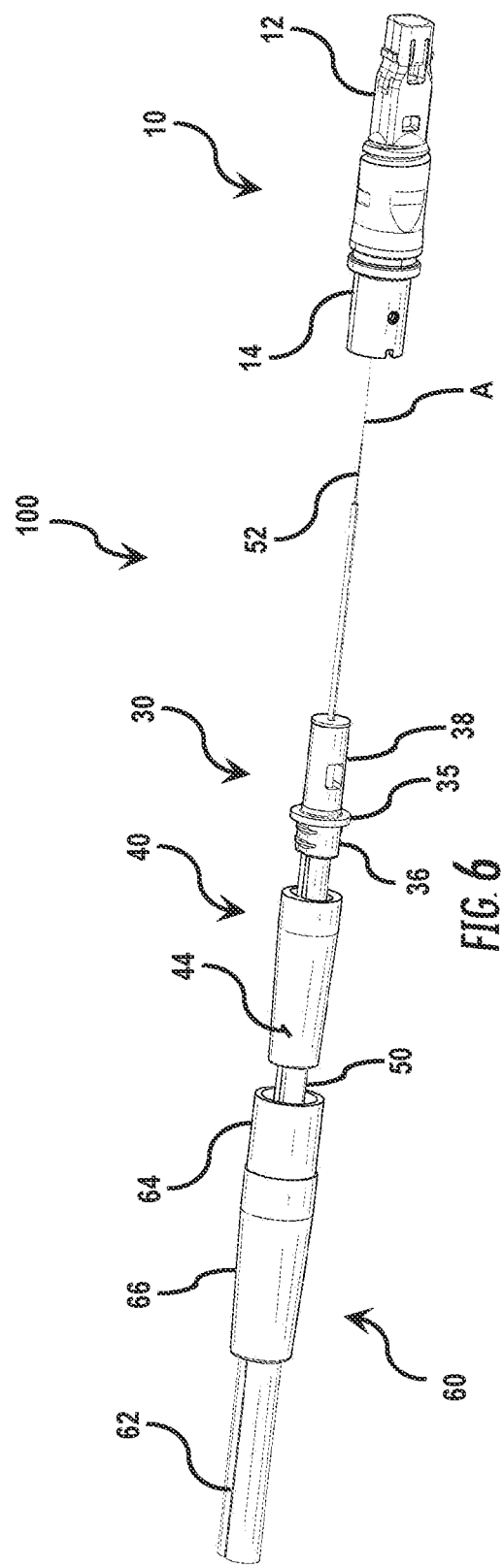
FIG. 6 is an alternative exploded view of selected components of FIG. 4.

Referring to FIG. 4, which is a cross-sectional illustration of the connectorized fiber optic cable assembly 100 of FIG. 1, to FIG. 4A, which is an exploded view of selected components of FIG. 4, and to FIG. 6, which is an alternative exploded view of selected components of the assembly 100, it is noted that the assembly 100 generally comprises a connector housing 10, an ferrule 20, a cable adapter 30, an adapter extension 40, a fiber optic cable 50 comprising an optical fiber 52, and a multi-diametrical sealing flexure 60. The connector housing 10, ferrule 20, cable adapter 30, adapter extension 40, and multi-diametrical sealing flexure 60 may be presented as respective single piece components, i.e., components that are fabricated from a single material and have a unitary compositional construction.

The connector housing 10 comprises a ferrule retaining portion 12, an adapter seating portion 14, and a longitudinal axis A that is obscured in FIGS. 4 and 4A but extends along the optical fiber 52 of the fiber optic cable 50, through the ferrule retaining portion 12 and the adapter seating portion 14 of the connector housing 10. The ferrule 20 is retained by the ferrule retaining portion 12 of the connector housing and comprises an optical fiber bore 22 that is aligned with the longitudinal axis A of the connector housing 10. For single fiber cables this alignment will be coaxial. For multifiber cables, this alignment will be orthogonally offset for one, more than one, or all of the optical fibers of the cable.

The cable adapter 30 comprises an optical cable passageway 32 and an optical fiber passageway 34, which are partially obscured in FIGS. 4 and 4A by the fiber optic cable 50, but are illustrated with further clarity in FIG. 11. The cable adapter 30 further comprises an extension securement portion 36, a housing insert portion 38 seated in the adapter seating portion 14 of the connector housing 10, and an adapter abutment 35. The adapter abutment 35, which functions as a stop surface, is positioned between the extension securement portion 36 and the housing insert portion 38 and serves to limit an extent to which the cable adapter 30 may extend into the adapter seating portion 14 of the connector housing 10.

Figure 9:
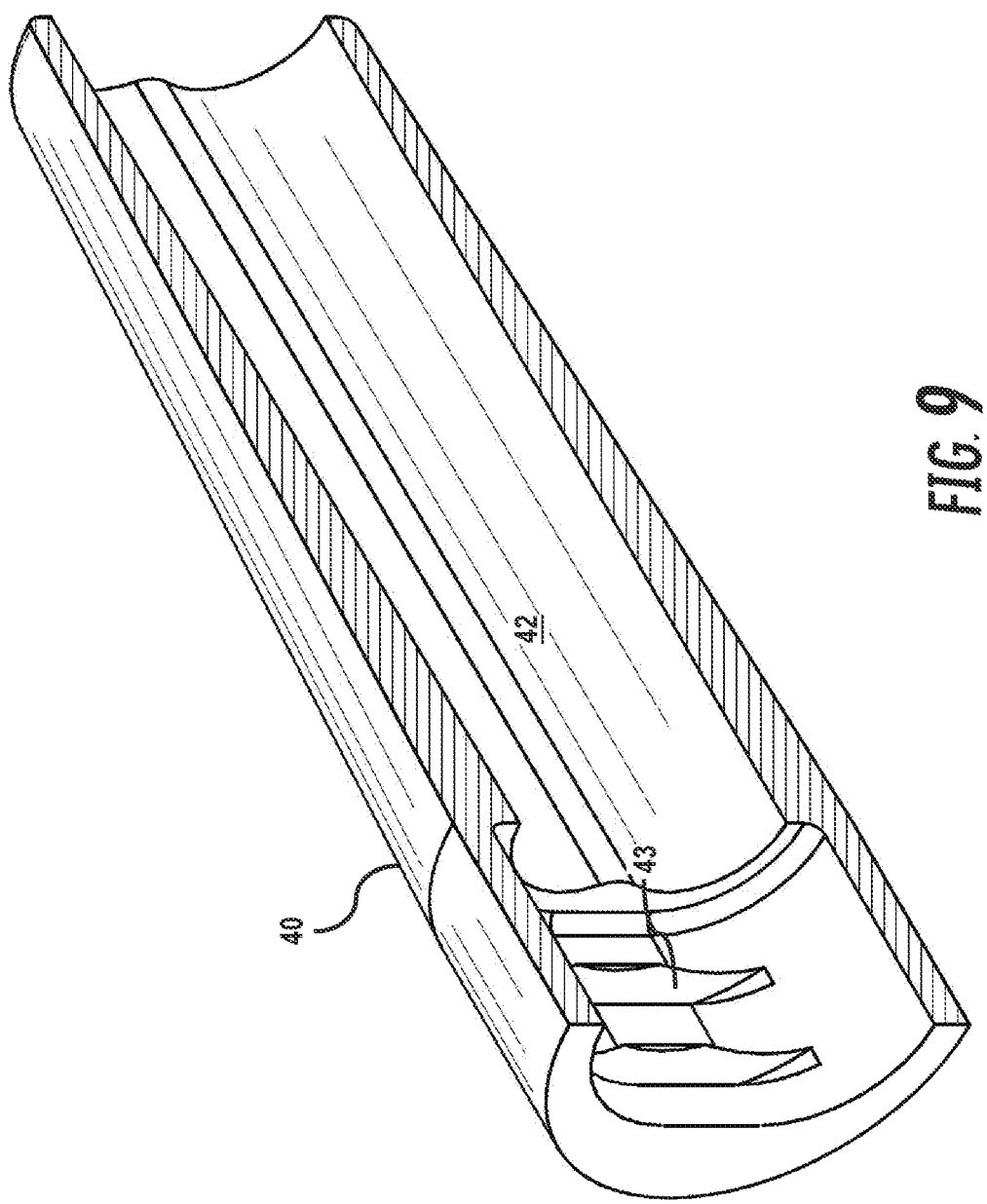
FIG. 9 illustrates an adapter extension according to embodiments of the present disclosure.

The adapter extension 40 is secured to the extension securement portion 36 of the cable adapter 30 and comprises an extended cable passageway 42, which is partially obscured in FIGS. 4 and 4A by the fiber optic cable 50, but is illustrated with further clarity in FIG. 9. The fiber optic cable 50 extends along the extended cable passageway 42 of the adapter extension 40 and the optical cable passageway 32 of the cable adapter 30. The optical fiber 52 of the fiber optic cable 50 extends along optical fiber passageway 34 of the cable adapter 30 to the optical fiber bore 22 of the ferrule 20.

The multi-diametrical sealing flexure 60 comprises a cable engaging portion 62 engaging an outer cable surface of the fiber optic cable, a housing engaging portion 64 engaging an outer housing surface of the connector housing, and an intermediate flexure portion 66 extending from the cable engaging portion 62 to the housing engaging portion 64 and engaging an outer extension surface 44 of the adapter extension 40.

Figure 5:
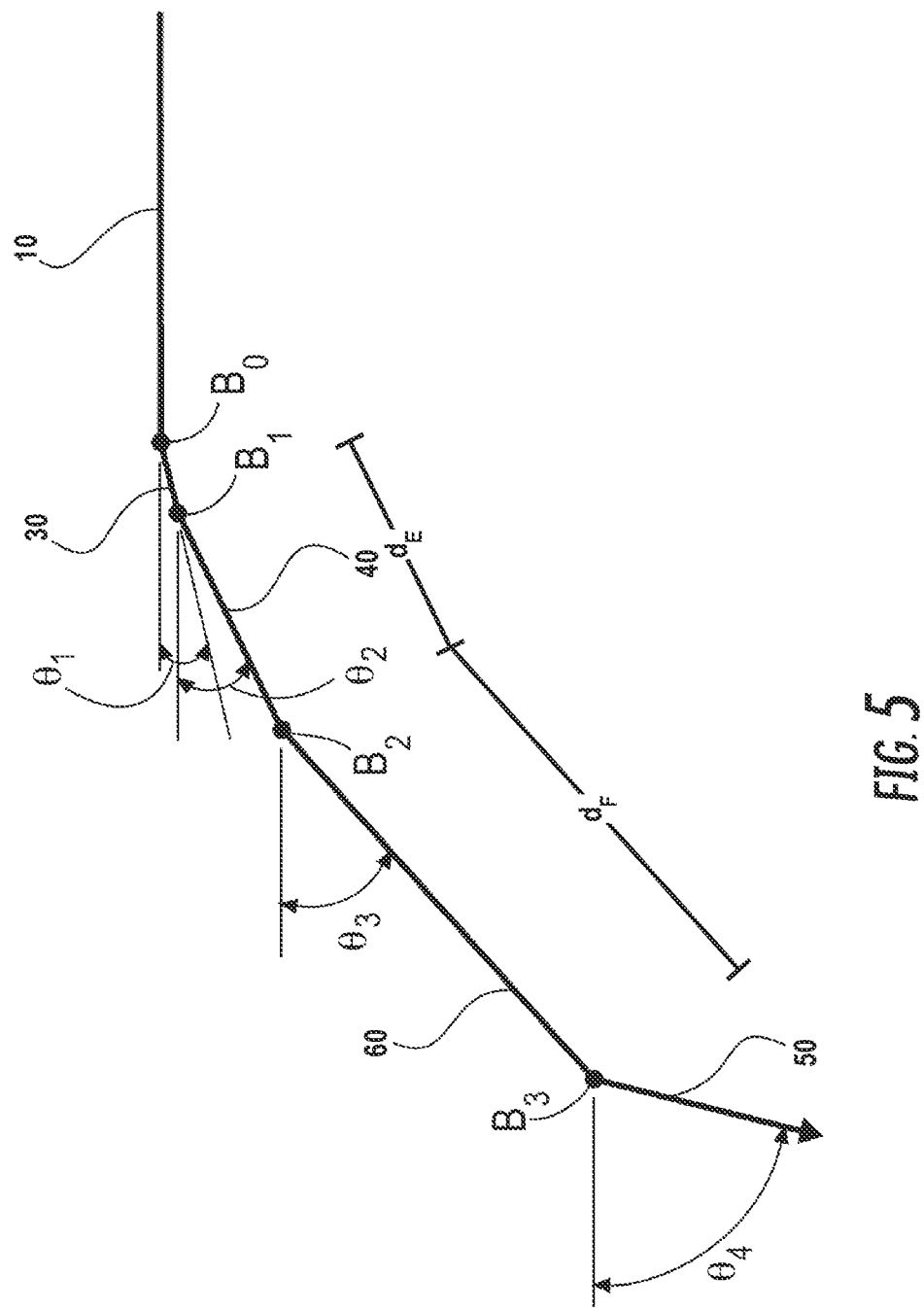
FIG. 5 is a schematic illustration of the multicomponent bending stiffness profile that may be presented by a fiber optic connector and a connectorized fiber optic cable assembly according to the present disclosure.

FIG. 5 is a schematic illustration of the multicomponent bending stiffness profile that may be presented by a fiber optic connector and a connectorized fiber optic cable assembly according to the present disclosure to protect the optical fiber 52 and other components of the fiber optic cable 50 from undue stress during installation and use. This bending stiffness profile and its respective component index values are conceptually related to the well-established concept of "flexural modulus," which can be used to characterize a material's ability to bend. Generally, stiffer connector components will yield less to bending forces than others and, as a result, generally higher bending index values can be associated with particular portions of such components. The bending index values B1, B2, B3, etc., recited herein are location-specific values that characterize the particular bending behavior of the connector at specific locations in the connector and will depend, for example, on the material forming the parts, the size and geometry of the parts, and the manner in which the parts cooperate with other parts in the connector assembly. For this reason, the bending index values B1, B2, B3, etc., are discussed herein in relative terms, with B1 being generally larger than B2, B2 being generally larger than B3, and B3 representing a degree of stiffness, or bend resistance, that may be greater than that of the fiber optic cable that is used with the optical fiber connector. In this manner, a connectorized fiber optic cable assembly may be constructed to present a degree of bend resistance that progresses from a relatively small value along the fiber optic cable itself, to progressively higher values as the cable extends farther and farther into the connector assembly of the cable. All bending index values and relative values disclosed herein are understood to be referenced at room temperature, which is defined herein as a temperature of between about 20° C. and bout 25° C.

More particularly, a particular bending index value $B_n$ at a specific free end location n on a connector part, refers to the bend resistance of the part at the free end, under a given non-destructive transverse fiber load F applied to the free end, and can be quantified by referring to the degree to which the free end deflects relative to an anchored portion of the connector assembly. Referring to the schematic illustration of FIG. 5, this relationship can be characterized by the following relation:

$$B_n = \frac{F}{\tan(\theta_n)}$$

where $\theta_n$ is the angle of deflection of the part at its free end, relative to an anchored portion of the connector assembly, and F represents the fiber load, in Newtons. In the context of connectorized cable assemblies, it is contemplated that some fiber optic cables will be so flexible that they do not support their own weight without bending, even when a relatively short length of cable is presented. In these cases, it may be said that the bending index value at a location along the cable will be very close to zero. At the opposite end of the spectrum lie highly rigid components, like connector housings, which may be characterized by nearly infinite bending index values under given non-destructive transverse loads.

It is contemplated that suitable transverse fiber loads F for establishing a particular bending index value $B_n$ will typically fall between about 10 N and about 50 N and can be considered non-destructive so long as it does not cause the cable adapter to deflect more than 45 degrees relative to connector housing, when the connector housing includes the anchored portion of the connector. Non-destructive transverse fiber loads F will also not be so great as to separate components of the connector from each other, damage components of the connector, or exceed the load limit of the connector port with which the connector is designed to cooperate.

Referring collectively to FIGS. 4, 4A, 5, and 6, a cable assembly 100 according to the present disclosure may comprise a multicomponent bending stiffness profile comprising a first bending index value B1 at a free end of the extension securement portion 36 of the cable adapter 30, a second bending index value B2 at a free end of the adapter extension 40, and a third bending index value B3 at a free end of the multi-diametrical sealing flexure 60, where B1>B2>B3. In one embodiment, B1>2(B2) and B2>2(B3), with B3 representing a degree of resistance to bending that is greater than that of the fiber optic cable. In many cases, the connector housing 10 will be relatively rigid. For example, the multicomponent bending stiffness profile may further comprise a housing bending index B0 that is at least three times greater than the first bending index value B1.

The inherent stiffness of each of the various materials used to fabricate the fiber optic connectors and connectorized fiber optic cable assemblies according to the present disclosure may also play a significant role in protecting the optical fiber 52 and other components of the fiber optic cable 50 from undue stress during installation and use. For example, given a relatively rigid connector housing 10 characterized by a Young's modulus $E_H$, it is contemplated that the cable adapter 30 may be characterized by a Young's modulus $E_A$, which is less than $E_H$. Similarly, the adapter extension 40 may be characterized by a Young's modulus $E_E$, which is less than $E_A$. Finally, the multi-diametrical sealing flexure 60 may be characterized by a Young's modulus $E_F$, which is less than $E_E$. The resulting assembly will assume a bend profile not unlike that illustrated schematically in FIG. 5, under given transverse loads. In particular embodiments, the connector housing 10 and the cable adapter 30 are fabricated from Polyetherimide, Polyethersulfone, PEEK, or combinations thereof.

In particular embodiments, the adapter extension 40 is characterized by a Young's modulus of between about 80 MPa and about 500 MPa, and the multi-diametrical sealing flexure 60 is characterized by a Young's modulus of between about 30 MPa and about 80 MPa, at room temperature. In such embodiments, the connector housing 10 may be characterized by a Young's modulus of between about 2000 MPa and about 6000 MPa, and the cable adapter 30 may be characterized by a Young's modulus of between about 1500 MPa and about 6000 MPa, at room temperature.

As is illustrated schematically in FIG. 5, and referring to the components illustrated in FIGS. 4, 4A and 6, the cable assembly 100 may be described as comprising a first bending terminus B1 at a free end of the extension securement portion 36 of the cable adapter 30, a second bending terminus B2 at a free end of the adapter extension 40, and a third bending terminus B3 at a free end of the multi-diametrical sealing flexure 60. In this context, embodiments are contemplated where the free end of the adapter extension 40 is displaced from the free end of the extension securement portion of the cable adapter 30 along the longitudinal axis A by an effective extension length $d_E$ of at least about 15 centimeters, or by an effective extension length $d_E$ of between about 15 millimeters and about 30 millimeters. Similarly, the free end of the multi-diametrical sealing flexure 60 may be displaced from the free end of the adapter extension 40 by an effective flexure length $d_F$ of at least about 30 millimeters, or by an effective flexure length $d_F$ of between about 30 millimeters and about 100 millimeters. In some implementations of the concepts of the present disclosure, it may be more preferable to refer to the following relation as a guide to designing the adapter extension 40 and the multi-diametrical sealing flexure 60:

$$1 \leq \frac{d_F}{d_E} \leq 4.$$

In other implementations of the concepts of the present disclosure, it may be more preferable to ensure that the effective extension length $d_E$ is at least about 10% of a length of a connectorized span of the cable assembly and that the effective flexure length $d_F$ is at least about 20% of a length of a connectorized span of the cable assembly.

Fiber optic connectors and connectorized fiber optic cable assemblies according to the present disclosure may be conveniently defined with reference to the various connector component interfaces embodied therein. These connector component interfaces may be presented at a variety of locations in an assembly and typically play a significant role in the integrity of the assembly because they provide non-destructive points of relief in the assembly under transverse loads. For example, referring to FIGS. 4 and 4A, a connectorized fiber optic cable assembly 100 according to the present disclosure may comprises a cable entry interface $I_1$, an adapter abutment interface $I_2$, and an adapter sealing interface $I_3$. The cable entry interface $I_1$ is formed by an inner surface of the extended cable passageway 42 of the adapter extension 40 and an outer surface of the fiber optic cable 50, where the fiber optic cable 50 extends into the extended cable passageway 42 of the adapter extension 40 towards the ferrule 20. The adapter abutment interface $I_2$ is formed by the adapter extension 40 and the adapter abutment 35 of the cable adapter 30, where the adapter extension 40 contacts an extension-facing surface 37 of the adapter abutment 35. The adapter sealing interface $I_3$ is formed by the adapter abutment 35 and the connector housing 10, where the adapter abutment 35 contacts an abutment facing surface 16 of the connector housing 10. The adapter abutment interface $I_2$ may be orthogonal to the longitudinal axis A of the connector housing 10. The adapter sealing interface $I_3$ originates at a housing-to-adapter elbow and may be orthogonal to the longitudinal axis A of the connector housing 10. The cable entry interface $I_1$ originates at a cable-to-connector elbow and may be oriented parallel to the longitudinal axis A of the connector housing 10, or otherwise be displaced from but extend in a common direction as the longitudinal axis A.

As is illustrated in FIG. 4, the multi-diametrical sealing flexure 60 forms respective strain relieving sealing bridges across each of these interfaces, i.e., by extending across the cable entry interface $I_1$, the adapter abutment interface $I_2$, and the adapter sealing interface $I_3$. More particularly, the cable entry interface $I_1$, the adapter abutment interface $I_2$, and the adapter sealing interface $I_3$ form respective non-destructive flexural relief points that are distributed along the length of the fiber optic connector formed by the connector housing 10, the ferrule 20, the cable adapter 30, and the adapter extension 40. The multi-diametrical sealing flexure 60 is sufficiently flexible to maintain a seal across these flexural relief points as the connectorized portion of the cable assembly 100 is subject to a transverse load, for example, a bend of at least about 90 degrees along the longitudinal axis of the connector.

Connectorized fiber optic cable assemblies according to the present disclosure may further comprise an adapter mounting interface $I_4$ formed by an inner surface of the extended cable passageway 42 of the adapter extension 40 and an outer surface of the extension securement portion 36 of the cable adapter 30, where the cable adapter 30 extends into the extended cable passageway 42 of the adapter extension 40, towards the cable entry interface $I_1$ of the adapter extension 40. In the illustrated embodiment, the adapter mounting interface $I_4$ is generally oriented parallel to the longitudinal axis A of the connector housing 10 but includes irregularities to enhance securement of the adapter extension 40 to the cable adapter 30.

Referring to FIG. 4, it is noteworthy that the aforementioned cable-to-connector and housing-to-adapter elbows, at which the cable entry interface $I_1$ and adapter sealing interface $I_3$ originate are oriented in opposite directions relative to the longitudinal axis A. More specifically, referring to FIG. 4A, the cable-to-connector elbow $E_1$ is oriented away from the ferrule retaining portion 12 of the connector housing 10, while, referring to FIG. 11, the housing-to-adapter elbow $E_2$ is oriented in the opposite direction. The housing-to-adapter elbow $E_2$ comprises an exposed anchoring face 39 on the adapter abutment 35 that is oriented towards the ferrule retaining portion 12 of the connector housing 10. The surface area of the exposed anchoring face 39 is, for example, at least about 5 square millimeters to ensure that it is sufficiently large to help fix the multi-diametrical sealing flexure 60 in place about the connector housing 10, the adapter extension 40, and the fiber optic cable 50. For example, where the exposed anchoring face 39 is presented as a substantially continuous annulus with an inner radius of about 1.5 centimeters and an outer radius of about 1.75 centimeters, the exposed anchoring face 39 would have a surface area of about 2.5 square centimeters. The opposing elbows $E_1$, $E_2$ act to secure the multi-diametrical sealing flexure 60 in place along the longitudinal axis A as it forms respective sealing bridges across the cable-to-connector elbow $E_1$ and the oppositely directed housing-to-adapter elbow $E_2$.

Referring further to FIGS. 4, 4A, 6, and 11, it is noted that the optical fiber passageway 34 of the cable adapter 30 is positioned along the longitudinal axis A between the optical cable passageway 32 of the cable adapter 30 and the ferrule 20. The optical cable passageway 32 of the cable adapter 30 is larger than the optical fiber passageway 34 of the cable adapter 30 because it must additionally accommodate a unstripped cable, i.e., a cable including a jacket, while the optical fiber passageway merely needs to be large enough to accommodate a stripped cable.

As is illustrated in FIG. 4A, the housing insert portion 38 of the cable adapter 30 extends from the adapter abutment 35, along the longitudinal axis A, towards the ferrule 20 for a seated length $d_S$. The extension securement portion 36 of the cable adapter 30 extends from the adapter abutment 35 in an opposite direction along the longitudinal axis A for an extension receiving length $d_R$, where:

$$d_R < d_S.$$

The free end of the extension securement portion 36 of the cable adapter 30 is displaced from a free end of the adapter extension 40 along the longitudinal axis by an effective extension length $d_E$, where:

$$d_R < d_E.$$

In a variety of embodiments, it is contemplated that the extended cable passageway 42 of the adapter extension may be between about 15 and about 30 millimeters in length, and the adapter extension 40 may comprise a wall thickness that is between about 1 millimeter and about 4 millimeters, over a majority of the length of the extended cable passageway 42 of the adapter extension 40. In other embodiments, the extended cable passageway of the adapter extension 40 is at least about 15 centimeters in length and the adapter extension 40 comprises a wall thickness that is less than about 1 millimeter over a majority of the length of the extended cable passageway 42 of the adapter extension 40. In still further embodiments, the extended cable passageway 42 of the adapter extension is at least about 20% as long as a connectorized span of the cable assembly 100, or between about 10% and about 30% as long as a connectorized span of the cable assembly, excluding the multi-diametrical sealing flexure 60. In other embodiments, the cable engaging portion 62 of the multi-diametrical sealing flexure 60 is at least about 50% as long as the extended cable passageway 42 of the adapter extension 40, or between about 50% and about 400% as long as the extended cable passageway of the adapter extension.

The adapter extension 40 may be fabricated from a material that is characterized by a Young's modulus of between about 80 MPa and about 500 MPa, at room temperature. For example, the adapter extension 40 may be fabricated from a thermoplastic elastomer such as Hytrel® 8238. Reference herein to a component being "fabricated from" a material should be taken to mean that the material takes up at least a majority of the material volume of the part, and often the substantial entirety of the part.

Figure 7:
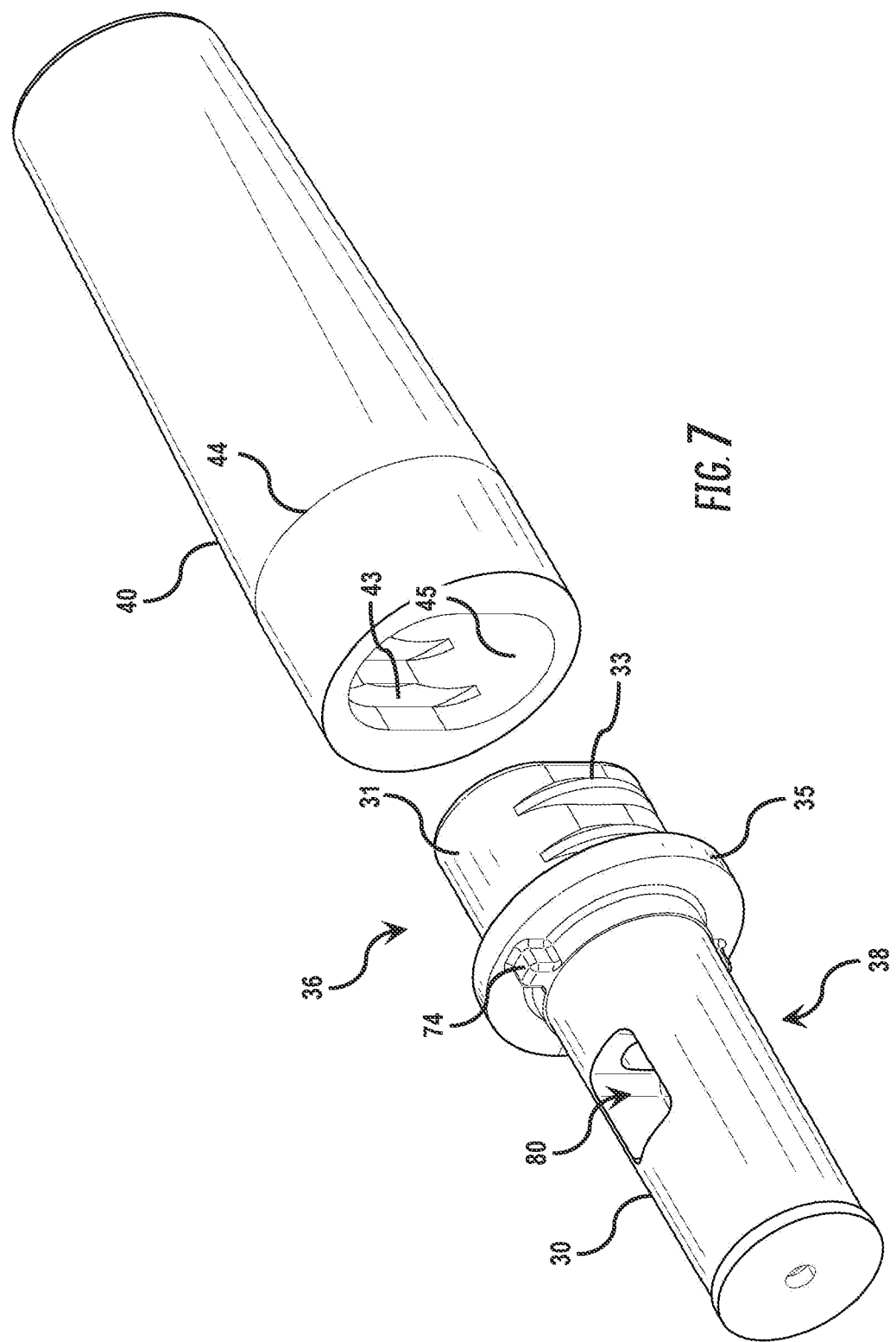
FIG. 7 illustrates a cable adapter and adapter extension according to embodiments of the present disclosure.
Figure 8:
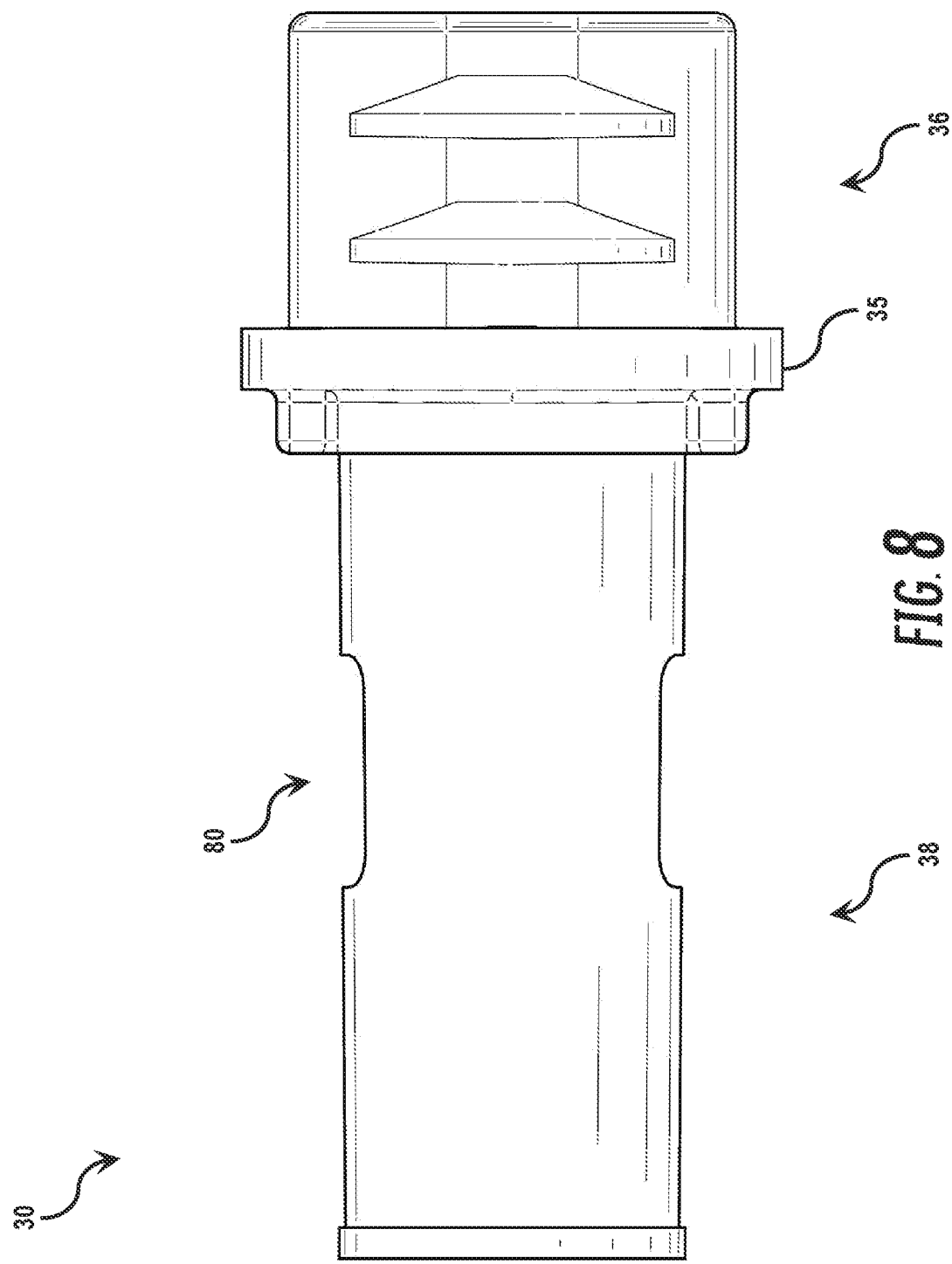
FIG. 8 illustrates a cable adapter according to embodiments of the present disclosure.

As is illustrated in FIG. 7, the adapter extension 40 may comprise an interior adapter-engaging surface 45 that is rotationally asymmetric relative to a longitudinal axis of the adapter extension 40, i.e., an axis that would extend along the longitudinal axis A of the connector housing 10 illustrated in FIG. 6. In which case, the extension securement portion 36 of the cable adapter 30 would comprise an exterior securement surface 31 that complements the rotational asymmetry of the interior adapter-engaging surface 45 of the adapter extension 40. This asymmetry helps to ensure that the adapter extension 40 and the fiber optic cable running there through, assume a proper rotational orientation relative to the cable adapter 30. To enhance securement, the interior adapter-engaging surface 45 of the adapter extension 40 and the exterior securement surface 31 of the extension securement portion 36 of the cable adapter 30 may comprise complementary locking projections 33 and locking recesses 43. In addition, the adapter extension 40 may comprise a rotationally symmetric an exterior surface 44 that spans a substantial entirety of the adapter extension 40 to enhance the ability of the adapter extension 40 to interface securely with the multi-diametrical sealing flexure 60.

It is contemplated that multi-diametrical sealing flexures according to the present disclosure may be characterized by a Young's modulus of between about 30 MPa and about 80 MPa, at room temperature. For example, and not by way of limitation, multi-diametrical sealing flexures may comprise a heat shrink tube, i.e., a tubular structure and suitable composition that may be shrunk about the remaining parts of the connectorized cable assembly at a temperature that is low enough to avoid heat related damage to the remaining parts of the connectorized cable assembly. For example, it is contemplated that suitable heat shrink tubing may comprise adhesive lined polyolefin 3:1 or 4:1 heat shrink tubing.

Referring to FIGS. 4 and 6, the cable engaging portion 62 of the multi-diametrical sealing flexure 60 may be between about 30 and about 100 millimeters in length and the multi-diametrical sealing flexure 60 may comprises a wall thickness that is less than about 1 millimeter, or between about 1 millimeters and about 4 millimeters, over a majority of the length of the cable engaging portion 62 of the multi-diametrical sealing flexure 60. In some embodiments, the cable engaging portion 62 of the multi-diametrical sealing flexure is at least about 20% as long as a connectorized span of the cable assembly 100.

The adapter 30 and adapter extension 40 are illustrated in FIGS. 4, 4A, 6, and 7 as two separate components that are secured to each other. It is also contemplated that the adapter extension 40 may be integrated with the cable adapter 30 as a single component, in which case it would be preferable to fabricate the unitary component such that the portion forming the adapter extension 40 is made from a material characterized by a Young's modulus $E_E$ that would be less than the Young's modulus $E_A$ of the portion forming the cable adapter 30. For example, the adapter 30 and adapter extension 40 may be fabricated as a unitary molded part.

Figure 10:
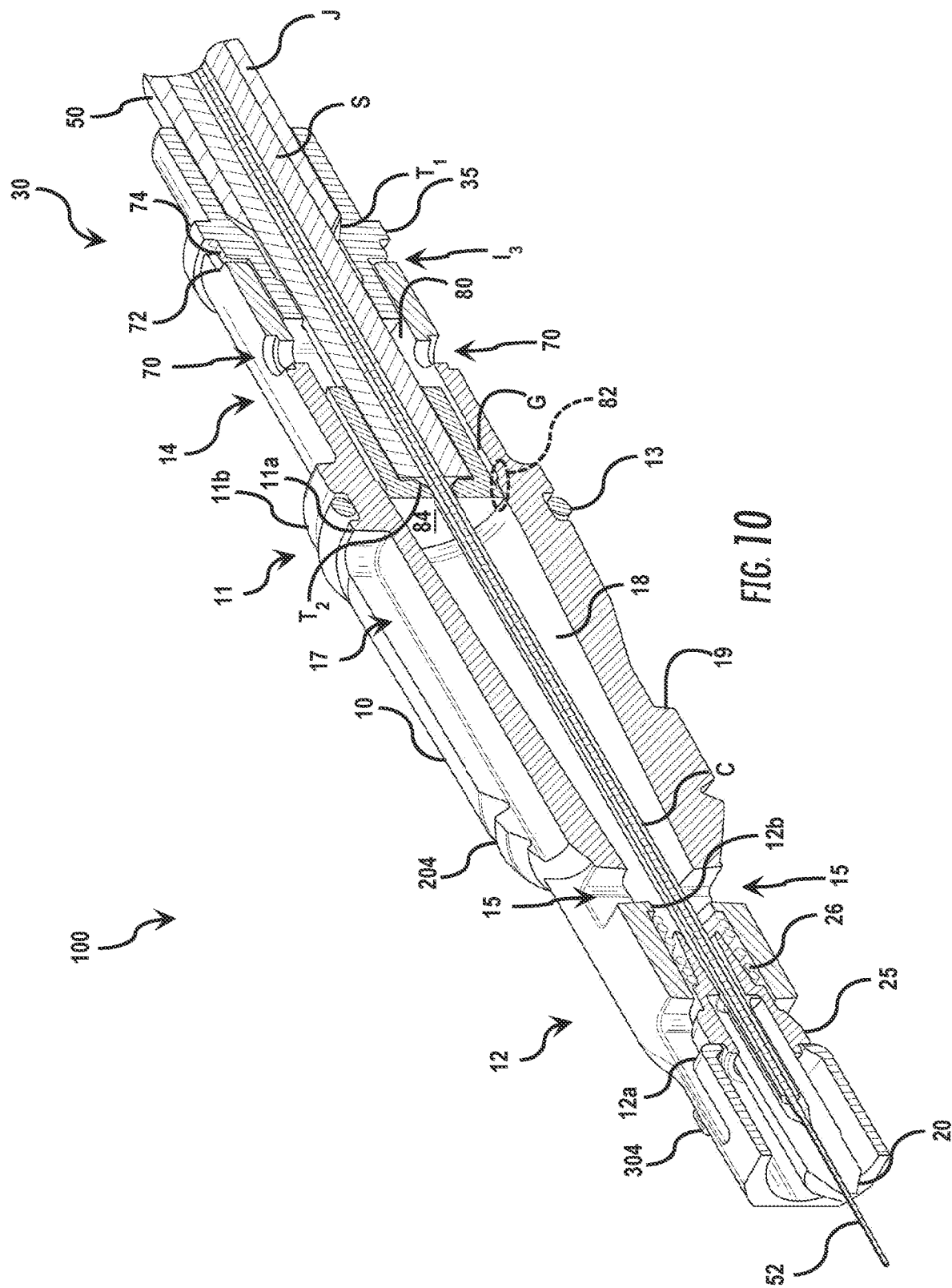
FIG. 10 illustrates a portion of a connectorized cable assembly according to embodiments of the present disclosure.

Referring to FIGS. 7, 8, 10, and 11, where like elements are denoted with like reference numerals, particular embodiments of the present disclosure relate specifically to the use of adhesives in connectorization, to the features of the cable adapter 30 and the adapter seating portion 14 of the connector housing 10, and the manner in which these features cooperate to facilitate effective connectorization of a fiber optic cable assembly. FIG. 10 illustrates the connectorized fiber optic cable assembly 100 of FIG. 1 from a different perspective, and without a multi-diametrical sealing flexure, to help clarify the nature of particular components of the assembly. More specifically, in FIG. 10, the fiber optic connector portion of the cable assembly 100 comprises a connector housing 10 with a ferrule retaining portion 12 and an adapter seating portion 14, as is described above. FIG. 10 also shows adhesive injection ports 70 in the adapter seating portion 14 of the connector housing 10, which ports extend through the wall of the connector housing 10, i.e., from an outer surface of the connector housing 10 to an inner surface of the connector housing 10, and permit the pressurized or non-pressurized introduction of adhesive into an interior potting cavity of the connector housing 10.

Referring specifically to FIGS. 10 and 11, as is noted above, the cable adapter comprises an optical cable passageway 32, an optical fiber passageway 34, and a housing insert portion 38 that is structurally configured to be seated in the adapter seating portion 14 of the connector housing 10. The optical cable passageway 32 of the cable adapter 30 is preferably large enough to accommodate a jacketed portion J of a fiber optic cable 50. The optical fiber passageway 34 of the cable adapter 30 is smaller than the optical cable passageway 32 and is large enough to accommodate a coated and/or buffered optical fiber C and any longitudinal strength members S running with the coated optical fiber C. In this context, the optical cable passageway 32 may be provided with a stripped cable transition $T_1$ to a reduced interior cross section that is large enough to accommodate a stripped optical cable. Similarly, the optical fiber passageway 34 may be provided with an optical fiber transition $T_2$ to a reduced interior cross section comprising an optical fiber port that is large enough to accommodate a coated optical fiber.

It is contemplated that the above-noted cable adapter passageways can be sized and shaped to accommodate a variety of fiber optic cables including, for example, a single fiber cable of the type illustrated in FIG. 10. In one embodiment, for a coated optical fiber having an OD of about 900 μm (micrometers), the optical fiber aperture of the cable adapter will have an ID of about 950 μm, to provide about 50 μm of free space about the coated optical fiber. Similarly, the optical fiber passageway will be large enough to provide up to about 200 μm of free space about the optical fiber and associated strength members. The reduced interior cross section of the optical cable passageway will be large enough to provide up to about 300 μm of free space about the stripped cable portion, and the larger portion of the optical cable passageway will provide up to about 300 μm of free space about the jacketed fiber optic cable.

FIG. 10 also illustrates the provision of a pair of opposed fiber clamping windows 15 in the connector housing 10. These clamping windows 15 provide a clear path to the coated/buffered portion C of the optical fiber 52 inside the connector housing 10, between the fiber buckling chamber 18 and the ferrule retaining portion 12 of the connector housing 10 to facilitate fiber clamping during ferrule or ferrule holder installation. More specifically, the optical fiber 52 may be clamped in a suitable manner through these opposing windows 15 as the ferrule 20 and/or ferrule holder 25 is inserted into housing and installed on the end of the optical fiber 52. Clamping the optical fiber 52 in this manner helps prevent the optical fiber 52 from being pushed rearward or buckling as the ferrule 20 and/or ferrule holder 25 is installed.

FIG. 12 illustrates the provision of a subcutaneous sealing element 90 between an outer surface of the connector housing 10 and an inner surface of the multi-diametrical sealing flexure 60. The subcutaneous sealing element 90 may be presented as an O-ring or other type of sealing element, may bound an entire rotational periphery of the connector housing 10 about the longitudinal axis A of the connector housing 10, and may cooperate with the multi-diametrical sealing flexure 60 to form an annular projection 94 in an outer surface of the multi-diametrical sealing flexure 60. The outer surface of the connector housing 10 may be provided with a seal accommodating groove 92 may be formed in the outer surface of the connector housing 10 to receive and secure the subcutaneous sealing element 90 beneath the multi-diametrical sealing flexure 60. As is illustrated in FIG. 12, this sealing element 90 can be used to create a continuous, sealed interference fit between the connectorized portion of the cable assembly and the port structure 96 with which it is to be coupled to keep dirt and debris from lodging in the circumferential gap between the connector and the port.

FIGS. 7, 8, 10, and 11 most clearly show an adhesive window 80 in the housing insert portion 38 of the cable adapter 30. This adhesive window 80 communicates with the optical fiber passageway 34 of the cable adapter 30 to provide a path for injecting an adhesive through one or both of the adhesive injection port 70, into the adhesive window 80, to secure the cable adapter 30 in the connector housing 10 and to secure the optical fiber 52, and any associated cable components in the housing insert portion 38 of the cable adapter 30.

The adhesive window 80 should be large enough to provide clearance for adhesive introduced into one or both of the injection ports 70 to pass across at least a portion of the optical fiber passageway 34 of the cable adapter 30 when a stripped portion of a fiber optic cable 50 extends along the optical fiber passageway 34. In particular embodiments, including the illustrated embodiment, the adhesive window 80 extends across the entirety, or at least a majority, of the cable adapter 30 in a crossing direction that is orthogonal to the optical fiber passageway 34 of the cable adapter 30. The adhesive window 80 also extends orthogonally to the crossing direction and the optical fiber passageway 34 to a lateral depth that is large enough to reduce the outer wall thickness of the cable adapter 30. This enlarges a portion the optical fiber passageway 34 to form a fiber potting portion in the optical fiber passageway where a substantial amount of adhesive can be held and cured to secure the optical fiber 52 and any associated cable components in the expanded space, in the cable adapter 30. In particular embodiments, it is contemplated that the lateral depth reduces the outer wall thickness of the cable adapter 30 in the fiber potting portion of the optical fiber passageway 34 by between about 0.3 millimeters and about 0.8 millimeters.

To facilitate the aforementioned pressurized or non-pressurized adhesive injection, the cable adapter 30 and the connector housing 10 can be structurally configured to form complementary keying surfaces that are positioned to align the adhesive injection ports 70 of the connector housing 10 with the adhesive window 80 of the cable adapter 30. More specifically, complementary keying surfaces may be formed where the adapter abutment 35 contacts the abutment facing surface 16 of the connector housing by, for example, providing a keyed cut-out 72 in the connector housing 10 and a keyed projection 74 in the cable adapter 30.

FIG. 11 and, to some extent, FIG. 10 show how an interior surface of the connector housing 10 and an exterior surface of the cable adapter 30 can be fashioned to form a capillary gap G when the housing insert portion 38 of the cable adapter 30 is seated in the adapter seating portion 14 of the connector housing 10. This capillary gap G is illustrated in FIGS. 10 and 11 as an annular gap that is interrupted by the adhesive injection ports 70 of the connector housing 10 and the adhesive window 80 of the cable adapter 30. Even if the capillary gap G is not an annular gap, it may be displaced from and extend parallel to the longitudinal axis of the connector housing 10, which runs coaxially with the core of the optical fiber 52.

In the illustrated embodiment, the capillary gap G is formed between an expanded inner dimension of the connector housing 10 and a restricted outer dimension of the cable adapter 30. It is, however, contemplated that a suitable capillary gap G may be formed by merely restricting the inner dimension of the connector housing 10 or the outer dimension of the cable adapter 30. Although the preferred size of the capillary gap will be dependent on the particular adhesive in use, it is contemplated that suitable gap spacings will, in many case, be less than about 0.15 millimeters for a majority of the extent of the gap, or between about 0.1 millimeters and about 0.3 millimeters for a majority of the extent of the gap. Preferred gap lengths will also depend on the particular adhesive in use, but it is contemplated that a suitable gaps will extend at least about 3 millimeters, or between about 3 millimeters and about 15 millimeters, parallel to the longitudinal axis.

Regardless of whether connectorized fiber optic cable assemblies according to the present disclosure utilize a capillary gap G, it is noted that, for optimum adhesion, an adhesive should thoroughly "wet out" the surfaces of the connector assembly to be bonded. In other words, the adhesive should flow and cover the surfaces to maximize the contact area and the attractive forces between the adhesive and bonding surfaces. Lower surface energy materials tend to spontaneously wet out higher energy surfaces. For a liquid adhesive to effectively wet out a surface, the surface energy of the adhesive should be as low, or lower than, the surface energy of the surfaces of the substrates to be bonded. If the liquid surface energy is significantly above that of the substrate surface, the substrate does not wet as well. Substrates to be bonded may be fabricated from materials, like ABS plastics, having relatively high surface energies. Alternatively, the surface of a relatively low surface energy material, like polypropylene or polyethylene, may be treated to increase the surface energy by, for example, exposing the surface to UV light, etching the surface, and/or treating the surface with a solvent.

Referring further to FIGS. 10 and 11, in the illustrated embodiment, the capillary gap G is displaced from and extends parallel to the longitudinal axis of the connector housing from the adapter sealing interface $I_3$ to an adhesive barrier 82 formed by portions of the cable adapter 30 and the connector housing 10 when the housing insert portion 38 of the cable adapter 30 is seated in the adapter seating portion 14 of the connector housing 10. The adhesive barrier can be positioned between the capillary gap G and the ferrule retaining portion 12 of the connector housing, between the capillary gap G and a fiber buckling chamber 18 of the connector housing 10, or both, to help preserve the integrity of the optical coupling at the ferrule 20.

For annular capillary gaps G, this adhesive barrier 82 is also annular. The adhesive barrier 82 can be formed at a press-fit engagement interface between respective surfaces of the cable adapter 30 and the connector housing 10. This type of press-fit engagement can be facilitated by restricting the inner dimension of the connector housing, expanding the outer dimension of the cable adapter, or both.

The adhesive injection ports 70 and the adhesive window 80 can be positioned between the adapter sealing interface $I_3$ and the adhesive barrier 82 to help facilitate uniform distribution of the injected adhesive.

To maintain the integrity of the adhesive barrier 82 and permit passage of the optical fiber 52, the cable adapter 30 also comprises a fiber admitting face 84 extending across an interior dimension of the annular adhesive barrier 82 and comprising an optical fiber aperture 86. The optical fiber aperture 86 is designed to closely approximate the size and shape of the external profile of the optical fiber portion of the connectorized optical cable. For example, and not by way of limitation, for single fiber cables, the optical fiber aperture will have a diameter of between about 250 µm and about 1 millimeters, depending on whether the fiber is coated and/or buffered. The adapter sealing interface $I_3$, the adhesive barrier 82, and the fiber admitting face 84 collectively form a closed end of the connector housing when the cable adapter 30 is seated in the adapter seating portion 14 of the connector housing 10.

To help facilitate uniform adhesive injection through one or both of the adhesive injection ports 70, the connector housing 10 may be provided with a relief port in the adapter seating portion 14 of the connector housing 10. In one embodiment, adhesive is injected through only one of the injection ports 70 and the remaining injection port serves as the relief port—allowing air inside the connector assembly to escape when adhesive is injected. In another embodiment, the relief port is provided along a portion of the adapter sealing interface $I_3$, for example by providing relief gaps between the keyed cut-out 72 and the keyed projection 74.

Referring to FIGS. 10 and 12, in particular embodiments of the present disclosure, it is contemplated that the adhesive injection ports 70 of the connector housing 10 may be positioned to ensure that any excess adhesive or other surface irregularities created on the outer surface of the connector housing 10 when adhesive is injected into an interior potting cavity of the connector housing 10 through the adhesive injection ports 70 will not interfere with the keying or sealing functionality of the connectorized cable assembly 100 when it is engaged with a suitable port structure 96. It may also be advantageous to ensure that the adhesive injection ports 70 are positioned to prevent adhesive interference with the ferrule retaining portion 12 of the connector housing 10, and the ferrule 20, ferrule holder 25, and ferrule retention spring 26 incorporated therein. It may be further advantageous to ensure that the adhesive injection ports 70 are positioned to prevent adhesive interference with conversion housing engagement features, in embodiments where such features are provided on the connector housing 10. This positioning can be significant in embodiments of the present disclosure that utilize a cable adapter 30, and embodiments of the present disclosure where a cable adapter 30 and an adapter extension 40 are not needed.

More specifically, referring to FIGS. 10 and 12, the connector housing comprises ferrule retention features 12a, 12b in the ferrule retaining portion 12 of the connector housing, a keying feature 17 defined as a longitudinally oriented cut-out on an outer surface of the connector housing 10 in a keying portion of the connector housing, and sealing element retaining features 11a, 11b defined on the outer surface of the connector housing 10 in a sealing element retaining portion of the connector housing. The keying portion of the connector housing 10 is structurally configured to inhibit rotation of the connector housing 10 about the longitudinal axis when the housing 10 is engaged with a complementary keying portion of the port structure 96. The sealing element retention features 11a, 11b are structurally configured to help retain a sealing element 13 therein. The sealing element 13 may, for example, comprise an O-ring, and is designed to cooperate with an inner surface of the port structure 96 to help create a sealed engagement with the port structure 96 in the manner illustrated in FIG. 12.

The adhesive injection ports 70 are defined in a potting portion of the connector housing and extend from the outer surface of the connector housing 10 to an inner surface of the connector housing 10 to communicate with an interior potting cavity of the connector housing 10. In this embodiment, the adhesive injection ports 70 are positioned rearwardly of the ferrule retaining portion 12, the keying feature 17, and the sealing element retention features 11a, 11b. Stated differently, the adhesive injection ports 70 are separated from the ferrule retaining portion 12 of the connector housing 10 and the keying portion of the connector housing 10 by the sealing element retaining portion of the connector housing 10, along the longitudinal axis of the connector housing 10.

In particular embodiments, the connector housing 10 may further comprises a locking portion comprising a locking feature 19 that is defined on the outer surface of the connector housing 10 and is designed to inhibit axial movement of the connector housing 10 along a retracting direction of the fiber optic connector when the connectorized cable assembly 100 is engaged with a complementary securing member of a complementary port structure 96. In these embodiments, the adhesive injection ports 70 will be separated from the locking portion of the connector housing by the sealing element retaining portion of the connector housing 10, along the longitudinal axis of the connector housing 10, to help ensure that any excess adhesive or other surface irregularities created on the outer surface of the connector housing 10 when adhesive is injected into the interior potting cavity of the connector housing 10 through the adhesive injection ports 70 will not interfere with the locking functionality of the locking feature 19.

Referring to FIGS. 1-3, in addition to FIGS. 10 and 12, in further embodiments of the present disclosure, the connector housing 10 may comprise conversion housing engagement features. For example, the connector housing 10 may comprise a first type of engagement feature 204, in the form of an external threaded portion on the conversion housing 10, for interfacing with a complementary threaded portion of hardened conversion housing 200. The connector may also comprise a second type of engagement feature 304, in the form of tabs or slots near the ferrule retaining portion 12 of the conversion housing 10, for interfacing with a type SC conversion housing 300. In these embodiments, the adhesive injection ports 70 may be separated from the conversion housing engagement features 204, 304 by the sealing element retaining portion of the connector housing 10, along the longitudinal axis of the connector housing 10, to help ensure that any excess adhesive or other surface irregularities created on the outer surface of the connector housing 10 when adhesive is injected into the interior potting cavity of the connector housing 10 through the adhesive injection ports 70 will not interfere with proper engagement with the conversion housings 200, 300.

As is illustrated in FIGS. 10 and 12, the keying feature 17, the sealing element retention features 11a, 11b, the ferrule retention features 12a, 12b, and the locking feature 19 may be defined in the connector housing 10 in a variety of ways including, for example, as projections, depressions, or cutouts, formed on or in an outer or inner surface of the connector housing 10, through the connector housing 10, or combinations thereof.

It is noted that recitations herein of a component of the present disclosure being "structurally configured" in a particular way, to embody a particular property, or to function in a particular manner, are structural recitations, as opposed to recitations of intended use. More specifically, reference herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A fiber optic connector comprising:
a connector housing comprising a longitudinal axis;
a multi-diametrical sealing flexure comprising a cable engaging portion sized for engaging an outer cable surface and a connector housing engaging portion sized for engaging an outer housing surface of the connector housing; and
a subcutaneous sealing element configured for positioning between an outer surface of the connector housing and an inner surface of the multi-diametrical sealing flexure, wherein the subcutaneous sealing element bounds an entire rotational periphery of the connector housing about the longitudinal axis of the connector housing and cooperates with the multi-diametrical sealing flexure to form an annular projection in an outer surface of the multi-diametrical sealing flexure when assembled.

2. The fiber optic connector of claim 1, wherein the connector housing defines a sealing element retention feature.

3. The fiber optic connector of claim 2, further comprising a sealing element configured for positioning on the sealing element retention feature of the connector housing.

4. The fiber optic connector of claim 3, wherein the sealing element is an O-ring.

5. The fiber optic connector of claim 1, wherein an outer surface of the connector housing defines a seal accommodating groove, and wherein the seal accommodating groove is configured for positioning the subcutaneous sealing element.

6. The fiber optic connector of claim 1, wherein the subcutaneous sealing element comprises an O-ring.

7. The fiber optic connector of claim 1 terminating a fiber optic cable comprising an optical fiber.

8. The fiber optic connector of claim 1, wherein the connector housing has a Young's modulus $E_H$ and the multi-diametrical sealing flexure has a Young's modulus $E_F$ such that $E_F$ is less than $E_H$.

* * * * *

UNITED STATES PATENT AND TRADEMARK OFFICE
CERTIFICATE OF CORRECTION

PATENT NO. : 11,536,913 B2
APPLICATION NO. : 17/530749
DATED : December 27, 2022
INVENTOR(S) : Joel Christopher Rosson Page 1 of 3

It is certified that error appears in the above-identified patent and that said Letters Patent is hereby corrected as shown below:

On the Title Page

In item (56), in Column 2, under "Other Publications", Line 1, delete "Plasti" and insert -- Plastic --.

On the page 5, item (56), in Column 2, under "U.S. Patent Documents", Line 62, delete "Ne" and insert -- Courchaine --.

On the page 11, item (56), in Column 1, under "Other Publications", Line 38, delete "lopp" and insert -- loop --.

On the page 11, item (56), in Column 2, under "Other Publications", Line 16, delete "Writien" and insert -- Written --.

On the page 11, item (56), in Column 2, under "Other Publications", Line 18, delete "Writien" and insert -- Written --.

On the page 11, item (56), in Column 2, under "Other Publications", Line 20, delete "Writien" and insert -- Written --.

On the page 11, item (56), in Column 2, under "Other Publications", Line 22, delete "Writien" and insert -- Written --.

On the page 11, item (56), in Column 2, under "Other Publications", Line 24, delete "Writien" and insert -- Written --.

On the page 11, item (56), in Column 2, under "Other Publications", Line 26, delete "Writien" and insert -- Written --.

Signed and Sealed this
Seventeenth Day of December, 2024

Derrick Brent
*Acting Director of the United States Patent and Trademark Office*

CERTIFICATE OF CORRECTION (continued)
U.S. Pat. No. 11,536,913 B2

On the page 11, item (56), in Column 2, under "Other Publications", Line 28, delete "Writien" and insert -- Written --.

On the Page 11, item (56), in Column 2, under "Other Publications", Line 30, delete "Writien" and insert -- Written --.

On the page 11, item (56), in Column 2, under "Other Publications", Line 32, delete "Writien" and insert -- Written --.

On the page 11, item (56), in Column 2, under "Other Publications", Line 34, delete "Writien" and insert -- Written --.

On the page 11, item (56), in Column 2, under "Other Publications", Line 36, delete "Writien" and insert -- Written --.

On the page 11, item (56), in Column 2, under "Other Publications", Line 38, delete "Writien" and insert -- Written --.

On the page 11, item (56), in Column 2, under "Other Publications", Line 40, delete "Writien" and insert -- Written --.

On the page 11, item (56), in Column 2, under "Other Publications", Line 42, delete "Writien" and insert -- Written --.

On the page 11, item (56), in Column 2, under "Other Publications", Line 44, delete "Writien" and insert -- Written --.

On the page 11, item (56), in Column 2, under "Other Publications", Line 46, delete "Writien" and insert -- Written --.

On the page 11, item (56), in Column 2, under "Other Publications", Line 48, delete "Writien" and insert -- Written --.

On the page 11, item (56), in Column 2, under "Other Publications", Line 50, delete "Writien" and insert -- Written --.

On the page 11, item (56), in Column 2, under "Other Publications", Line 52, delete "Writien" and insert -- Written --.

On the page 11, item (56), in Column 2, under "Other Publications", Line 54, delete "Writien" and insert -- Written --.

On the page 11, item (56), in Column 2, under "Other Publications", Line 56, delete "Writien" and insert -- Written --.

CERTIFICATE OF CORRECTION (continued)
U.S. Pat. No. 11,536,913 B2

On the page 12, item (56), in Column 2, under "Other Publications", Line 5, delete "Poeceedings" and insert -- Proceedings --.

On the page 12, item (56), in Column 2, under "Other Publications", Line 11, delete "Ughtwave.," and insert -- Lightwave., --.

On the page 12, item (56), in Column 2, under "Other Publications", Line 16, delete "el:120046715" and insert -- el:20046715 --.

On the page 12, item (56), in Column 2, under "Other Publications", Line 17, delete ""1 xN" and insert -- "1xN --.